(12) United States Patent
Nakamura

(10) Patent No.: US 7,103,660 B2
(45) Date of Patent: Sep. 5, 2006

(54) INFORMATION PROCESSING APPARATUS, METHOD THEREOF, NETWORK SYSTEM, RECORD MEDIUM, AND PROGRAM

(75) Inventor: Ikuo Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 979 days.

(21) Appl. No.: 09/792,817

(22) Filed: Feb. 23, 2001

(65) Prior Publication Data

US 2001/0051930 A1 Dec. 13, 2001

(30) Foreign Application Priority Data

Feb. 23, 2000 (JP) ............................. 2000-052146

(51) Int. Cl.
*G06F 15/173* (2006.01)
(52) U.S. Cl. ...................... 709/225; 709/229; 713/200
(58) Field of Classification Search ................ 709/225, 709/226, 229; 713/200, 201, 202
See application file for complete search history.

(56) References Cited

U.S. PATENT DOCUMENTS

| | | | |
|---|---|---|---|
| 5,513,263 A | 4/1996 | White et al. | |
| 5,611,050 A | 3/1997 | Theimer et al. | |
| 5,696,898 A | 12/1997 | Baker et al. | |
| 5,909,183 A | 6/1999 | Borgstahl et al. | |
| 5,941,947 A | 8/1999 | Brown et al. | |
| 6,032,202 A * | 2/2000 | Lea et al. ....................... | 710/8 |
| 6,061,794 A * | 5/2000 | Angelo et al. ................ | 713/200 |
| 6,212,633 B1 * | 4/2001 | Levy et al. ................... | 713/153 |
| 6,510,236 B1 * | 1/2003 | Crane et al. ................. | 382/116 |
| 6,636,973 B1 * | 10/2003 | Novoa et al. ............... | 713/202 |
| 6,675,208 B1 * | 1/2004 | Rai et al. .................... | 709/224 |
| 6,728,884 B1 * | 4/2004 | Lim ............................ | 713/201 |
| 6,735,619 B1 * | 5/2004 | Sawada ...................... | 709/212 |

FOREIGN PATENT DOCUMENTS

| | | |
|---|---|---|
| FR | 2 770 017 | 11/1997 |
| WO | WO 98/17032 | 4/1998 |
| WO | WO 98/59282 | 12/1998 |
| WO | WO 99/35816 | 7/1999 |

OTHER PUBLICATIONS

"Draft Standard for a High Performance Serial Bus Peer-to-Peer Data Transport Protocol (PPDT)", Prepared by the Microprocessor and Microcomputer Standards Committee of the IEEE Computer Society (Institute of Electrical and Electronics Engineers, Inc.), P1394.3, D2.0, Jul. 2000, pp. 79.

(Continued)

*Primary Examiner*—Mehmet B. Geckil
(74) *Attorney, Agent, or Firm*—Bell, Boyd & Lloyd LLC

(57) ABSTRACT

An information processing apparatus for controlling an electronic device connected on a network which includes a device attribute information obtaining part for obtaining device attribute information about the electronic device from the electronic device through the network, an operation range assigning part for assigning the operation range of each user for the electronic device corresponding to the device attribute information obtained by the device attribute information obtaining part and storing the assigned operation range, and a controlling part for controlling the electronic device through the network in the operation range that has been assigned by the operation range assigning part.

42 Claims, 21 Drawing Sheets

GUEST MANAGEMENT GUI SCREEN

OTHER PUBLICATIONS

"Draft High Performance Serial Bus Bridges", Prepared by the Microprocessor and Microcomputer Standards Committee of the IEEE Computer Society (Institute of Electrical and Electronics Engineers, Inc.), P1394.1, D0.16, Mar. 2001, pp. 120.

Access Control and Authorization Plan for Customer Control of Network Services, written by Che-Fn Yu, dated Nov. 27, 1989 (pp. 862-869).

* cited by examiner

Fig. 5

| USER | PASSWORD |
|------|----------|
| John | ****** |
| Paul | ****** |
| Ringo | ****** |
|  |  |

USER TABLE

Fig. 6

| DEVICE | USER ATTRIBUTE | USER NAME | ACCESS ID |
|--------|----------------|-----------|-----------|
| 001 | Owner | John | 4 |
|  | Guest | Paul | 1 |
|  |  | Ringo | 2 |
|  |  | Ringo | 1 |
|  | Anonymous | — | 3 |

DEVICE ACCESS TABLE

Fig. 7

| ID | ACCESS RIGHT |
|----|--------------|
| 0 | ALL CONTROLS PROHIBITED |
| 1 | REPRODUCTION FUNCTION CONTROL |
| 2 | RECORD FUNCTION CONTROL |
| 3 | POWER ON/OFF CONTROL |
| 4 | ALL CONTROLS |

ACCESS RIGHT TABLE

DEVICE SELECTION GUI SCREEN

LOGIN GUI SCREEN

MESSAGE SCREEN

MESSAGE SCREEN

NEW USER REGISTRATION GUI SCREEN

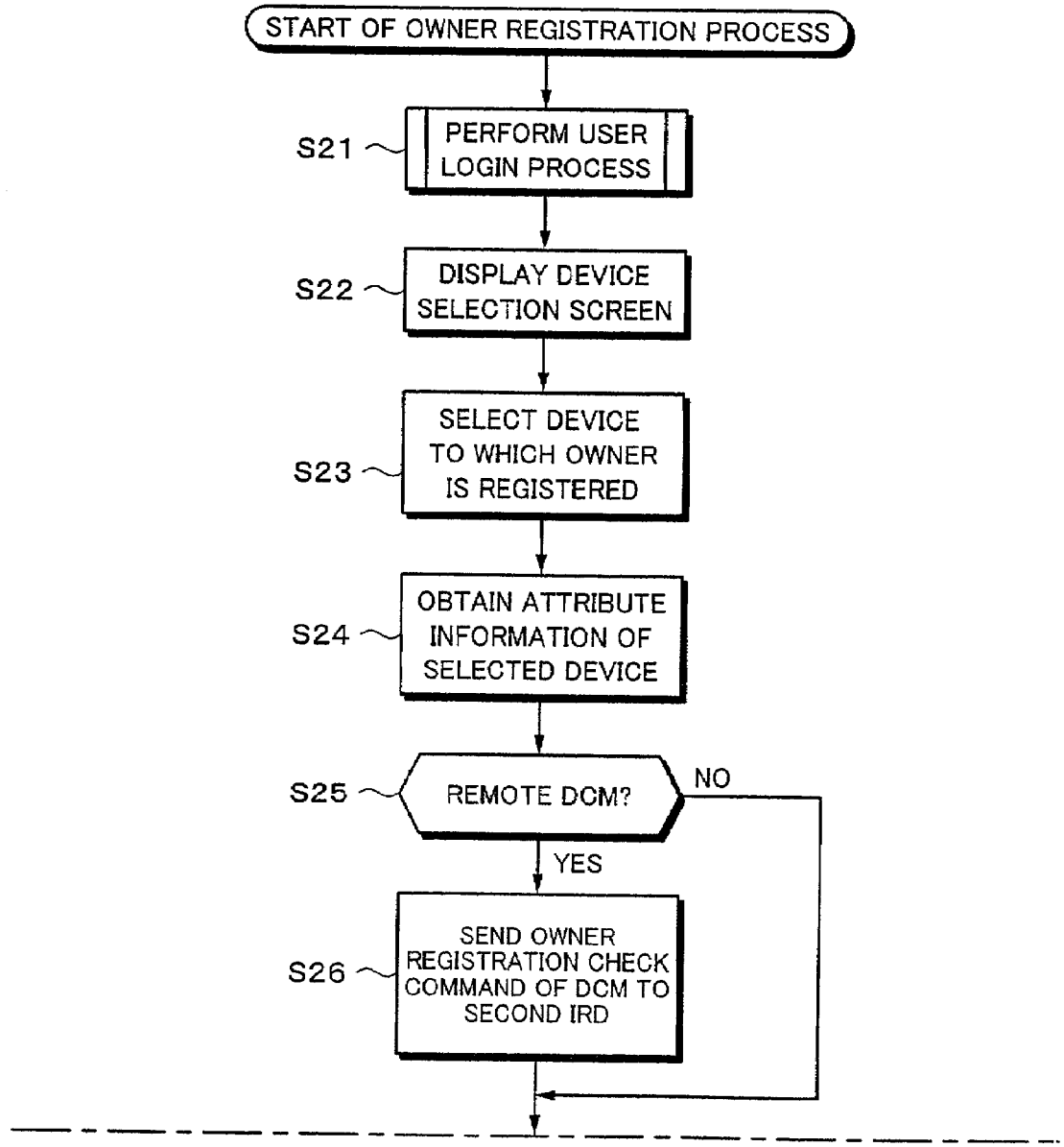

MESSAGE SCREEN

OWNER REGISTRATION GUI SCREEN

MESSAGE SCREEN

MESSAGE SCREEN

GUEST MANAGEMENT GUI SCREEN

PULL-DOWN MENU SCREEN

GUEST NAME REGISTRATION GUI SCREEN

GUEST NAME DELETE GUI SCREEN

ACCESS RIGHT ASSIGNMENT GUI SCREEN

MESSAGE SCREEN

MESSAGE SCREEN

MESSAGE SCREEN

MESSAGE SCREEN

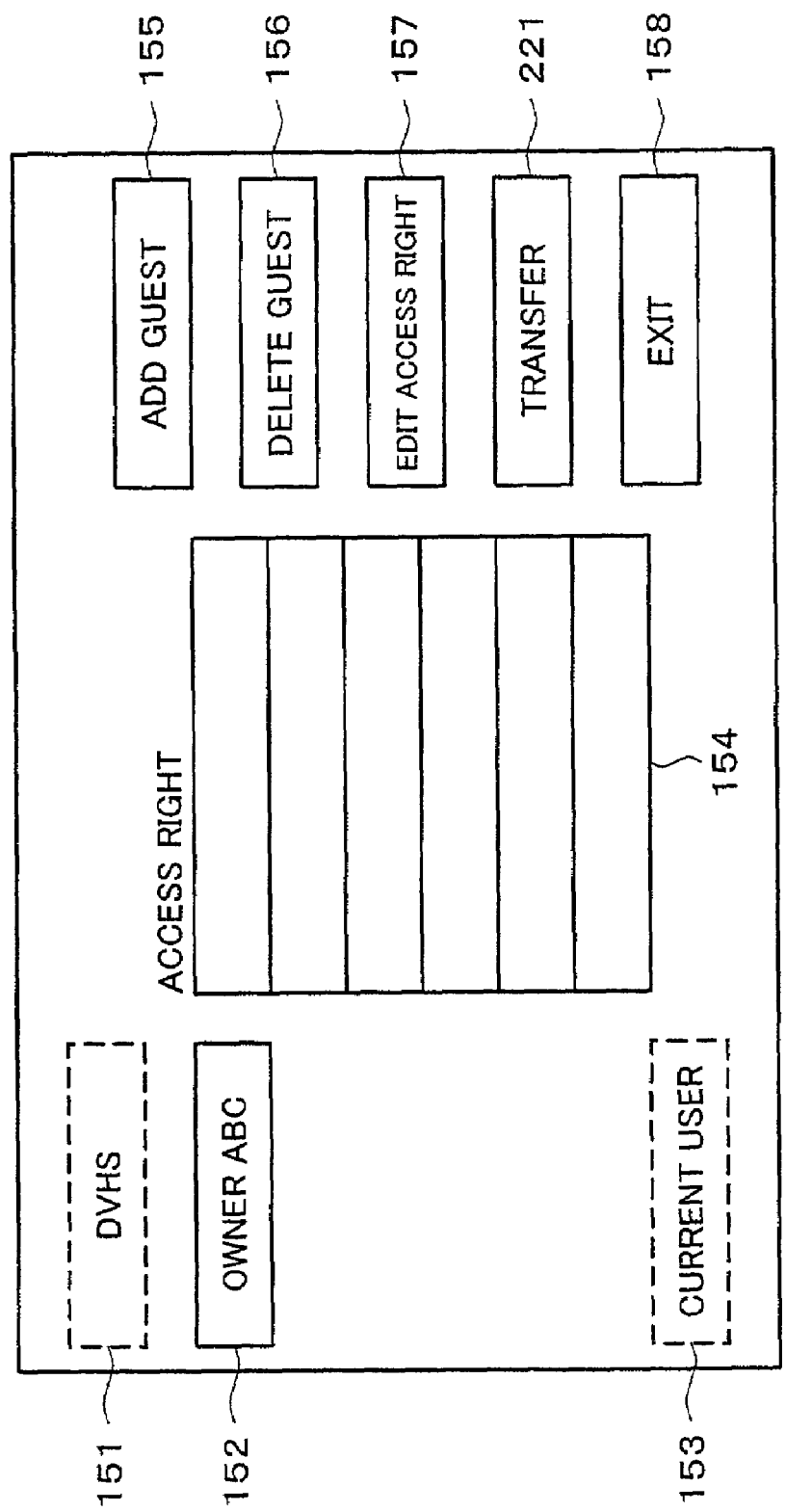

INFORMATION PROCESSING APPARATUS, METHOD THEREOF, NETWORK SYSTEM, RECORD MEDIUM, AND PROGRAM

BACKGROUND OF THE INVENTION

1. Field of the Invention

The present invention relates to an information processing apparatus, a method thereof, a network system, a record medium, and a program, for example, to those suitable for a home network system of which a number of digital AV (Audio Visual) devices are mutually connected through, for example, an IEEE (Institute of Electrical and Electronics Engineers) 1394 bus.

2. Description of the Prior Art

In recent years, as middleware for integrally managing and controlling a number of digital AV devices connected through an IEEE 1394 bus in a home network system, mutual connecting specifications referred to as HAVi (Home Audio/Video Interoperability Architecture) (trademark) have been proposed.

In such a home network system, when a digital AV device that operates on a controlling side (this device is referred to as controlling device) of a number of digital AV devices connected through an IEEE 1394 bus uploads control software that is stored in a digital AV device that operates on a controlled side (this device is referred to as controlled device), even if a number of devices whose manufacturers are different are connected, they can be normally and mutually operated.

However, in such a home network system, since each device can be freely used by anyone, there are problems about maintenance, management, and security for data of each user.

Thus, in consideration of an upcoming home network system using the HAVi, it is preferred to designate a user to each device on the network and allow only a designated user to use a designated device or a designated function thereof.

Conventionally, in personal computers and workstations, access rights are controlled for individual files or individual systems. However, thus far, it has not been considered about access rights for individual devices in the home network system.

SUMMARY OF THE INVENTION

The present invention is made from the above described point of view. An object of the present invention is to designate an operation range of each user for an electronic device.

A first information processing apparatus of the present invention is an information processing apparatus for controlling an electronic device connected on a network, including a device attribute information obtaining part for obtaining device attribute information about the electronic device from the electronic device through the network, an operation range assigning part for assigning the operation range of each user for the electronic device corresponding to the device attribute information obtained by the device attribute information obtaining part and storing the assigned operation range, and a controlling part for controlling the electronic device through the network in the operation range that has been assigned by the operation range assigning part.

The information processing apparatus may further include a control information obtaining part for obtaining control information for controlling the electronic device from the electronic device through the network. The controlling part may control the electronic device corresponding to the control information obtained by the control information obtaining part.

The information processing apparatus may further include a control information storing part for pre-storing control information for controlling the electronic device. The controlling part may control the electronic device corresponding to the control information pre-stored in the control information storing part.

The information processing apparatus may further include an owner registering part for registering the user as an owner who is capable of using all the operation range of the electronic device. The operation range assigning part may assign the operation range of each user for the electronic device corresponding to a command issued by the owner registered by the owner registering part.

The information processing apparatus may further include a user name inputting part for inputting a user name of a user who uses the electronic device, an authenticating part for authenticating the user name that has been input by the user name inputting part, and an owner determining part for determining whether or not the user name authenticated by the authenticating part is the owner registered by the owner registering part. When the determined result of the owner determining part represents that the user name is not the owner registered by the owner registering part, the operation range assigning part may not permit the user to assign the operation range of each user.

The information processing apparatus may further include a guest registering part for permitting a particular user as a guest to use all or part of the operation range of the electronic device, and an anonymous registering part for permitting an anonymous user to use all or part of the operation range of the electronic device.

The information processing apparatus may further include a user name inputting part for inputting a user name of a user who uses the electronic device, an authenticating part for authenticating the user name that has been input by the user name inputting part, and a guest determining part for determining whether or not the user name authenticated by the authenticating part is the guest registered by the guest registering part. When the determined result of the guest determining part represents that the user name is the guest registered by the guest registering part, the operation range assigning part may assign all or part of the operation range to the guest.

The information processing apparatus may further include an anonymous determining part for determining whether or not an anonymous user has been registered by the anonymous registering part when the determined result of the guest determining part represents that the user name is not the guest registered by the guest registering part. When the determined result of the anonymous determining part represents that the anonymous user has been registered by the anonymous registering part, the operation range assigning part may assign all or part of the operation range to the anonymous user. When the determined result of the anonymous determining part represents that the anonymous user has not been registered by the anonymous registering part, the controlling part may not control the electronic device.

The information processing apparatus may further include a user registering part for registering user information about a user who uses the electronic device, a user information inputting part for inputting the user information about the user who uses the electronic device, and an authenticating part for authenticating whether or not the user information that has been input by the user information inputting part has been registered by the user registering part. When the user information has been authenticated by the authenticating part, the controlling part may read the operation range corresponding to the user information from the operation range assigning part and controls the electronic device in the operation range. When the user information has not been authenticated by the authenticating part, the controlling part may not control the electronic device.

The information processing apparatus may further include a display controlling part for controlling a display of the operation range of each user stored by the operation range assigning part.

The device attribute information may include a device ID of the electronic device, a type of the electronic device, or information about a function of the electronic device. The network may be composed of an IEEE 1394 serial bus.

A first information processing method of the present invention is an information processing method for controlling an electronic device connected on a network, including the steps of (a) obtaining device attribute information about the electronic device from the electronic device through the network, (b) assigning the operation range of each user for the electronic device corresponding to the device attribute information obtained by the device attribute information obtaining step (a) and storing the assigned operation range, and (c) controlling the electronic device through the network in the operation range that has been assigned by the operation range assigning step (b).

A first record medium of the present invention is a record medium for recording a program that causes a computer to perform an information processing method for controlling an electronic device connected on a network, the method including the steps of (a) obtaining device attribute information about the electronic device from the electronic device through the network, (b) assigning the operation range of each user for the electronic device corresponding to the device attribute information obtained at the device attribute information obtaining step (a) and storing the assigned operation range, and (c) controlling the electronic device through the network in the operation range that has been assigned at the operation range assigning step (b).

A first program of the present invention is a program that causes a computer for controlling an electronic device connected on a network to execute the steps of (a) obtaining device attribute information about the electronic device from the electronic device through the network, (b) assigning the operation range of each user for the electronic device corresponding to the device attribute information obtained at the device attribute information obtaining step (a) and storing the assigned operation range, and (c) controlling the electronic device through the network in the operation range that has been assigned at the operation range assigning step (b).

According to a first information processing apparatus, and a first information processing method of the present invention, device attribute information is obtained from an electronic device through a network. An operation range of each user for the electronic device is assigned corresponding to the obtained device attribute information. The electronic device is controlled in the assigned operation range through the network.

A second information processing apparatus of the present invention is an information processing apparatus for controlling an electronic device connected on a network, including a device attribute information obtaining part for obtaining device attribute information about the electronic device from the electronic device through the network, an operation range assigning part for assigning the operation range of each user for the electronic device corresponding to the device attribute information obtained by the device attribute information obtaining part and storing the assigned operation range, and a transferring part for transferring the operation range of each user stored by the operation range assigning part to the electronic device through the network.

The information processing apparatus may further include a control information obtaining part for obtaining control information for controlling the electronic device from the electronic device through the network. The information processing apparatus may control the electronic device corresponding to the control information obtained by the control information obtaining part.

The information processing apparatus may further include a control information storing part for pre-storing control information for controlling the electronic device. The information processing apparatus may control the electronic device corresponding to the control information pre-stored in the control information storing part.

The information processing apparatus may further include an owner registering part for registering the user as an owner who is capable of using all the operation range of the electronic device. The operation range assigning part may assign the operation range of each user for the electronic device corresponding to a command issued by the owner registered by the owner registering part.

The information processing apparatus may further include a user name inputting part for inputting a user name of a user who uses the electronic device, an authenticating part for authenticating the user name that has been input by the user name inputting part, and an owner determining part for determining whether or not the user name authenticated by the authenticating part is the owner registered by the owner registering part. When the determined result of the owner determining part represents that the user name is not the owner registered by the owner registering part, the operation range assigning part may not permit the use to assign the operation range of each user.

The information processing apparatus may further include a guest registering part for permitting a particular user as a guest to use all or part of the operation range of the electronic device, and an anonymous registering part for permitting an anonymous user to use all or part of the operation range of the electronic device.

The information processing apparatus may further include a user name inputting part for inputting a user name of a user who uses the electronic device, an authenticating part for authenticating the user name that has been input by the user name inputting part, and a guest determining part for determining whether or not the user name authenticated by the authenticating part is the guest registered by the guest registering part. When the determined result of the guest determining part represents that the user name is the guest registered by the guest registering part, the operation range assigning part may assign all or part of the operation range to the guest.

The information processing apparatus may further include an anonymous determining part for determining whether or not an anonymous user has been registered by the anonymous registering part when the determined result of the guest determining part represents that the user name is not the guest registered by the guest registering part. When the determined result of the anonymous determining part represents that the anonymous user has been registered by the anonymous registering part, the operation range assigning part may assign all or part of the operation range to the anonymous user. When the determined result of the anonymous determining part represents that the anonymous user has not been registered by the anonymous registering part, the information processing apparatus may not control the electronic device.

The information processing apparatus may further include a user registering part for registering user information about a user who uses the electronic device, a user information inputting part for inputting the user information about the user who uses the electronic device, and an authenticating part for authenticating whether or not the user information that has been input by the user information inputting part has been registered by the user registering part. When the user information has been authenticated by the authenticating part, the information processing apparatus may read the operation range corresponding to the user information from the operation range assigning part and controls the electronic device in the operation range. When the user information has not been authenticated by the authenticating part, the information processing apparatus may not control the electronic device.

The information processing apparatus may further include a display controlling part for controlling a display of the operation range of each user stored by the operation range assigning part. The device attribute information may include a device ID of the electronic device, a type of the electronic device, or information about a function of the electronic device. The network may be composed of an IEEE 1394 serial bus.

A second information processing method of the present invention is an information processing method for controlling an electronic device connected on a network, including the steps of (a) obtaining device attribute information about the electronic device from the electronic device through the network, (b) assigning the operation range of each user for the electronic device corresponding to the device attribute information obtained at the device attribute information obtaining step (a) and storing the assigned operation range, and (c) transferring the operation range of each user stored by the operation range assigning step (b) to the electronic device through the network.

A second record medium of the present invention is a record medium for recording a program that causes a computer for performing an information processing method for controlling an electronic device connected on a network to execute the steps of (a) obtaining device attribute information about the electronic device from the electronic device through the network, (b) assigning the operation range of each user for the electronic device corresponding to the device attribute information obtained at the device attribute information obtaining step (a) and storing the assigned operation range, and (c) transferring the operation range of each user stored by the operation range assigning step (b) to the electronic device through the network.

A second program of the present invention is a program that causes a computer for controlling an electronic device connected on a network to execute the steps of (a) obtaining device attribute information about the electronic device from the electronic device through the network, (b) assigning the operation range of each user for the electronic device corresponding to the device attribute information obtained at the device attribute information obtaining step (a) and storing the assigned operation range, and (c) transferring the operation range of each user stored by the operation range assigning step (b) to the electronic device through the network.

According to a second information processing apparatus, a second information processing method, and a second information processing program of the present invention, device attribute information is obtained from an electronic device through a network. An operation range of each user for the electronic device is assigned corresponding to the obtained device attribute information. The operation range of each user is transferred to the electronic device through the network.

A third information processing apparatus of the present invention is an information processing apparatus connected to another information processing apparatus through a network, including a device attribute information storing part for storing device attribute information about the local information processing apparatus, a device attribute information transmitting part for transmitting the device attribute information stored in the device attribute information storing part to the other information processing apparatus through the network corresponding to a request of the other information processing apparatus, and an operation range obtaining part for obtaining the operation range of each user from the other information processing apparatus through the network and storing the obtained operation range.

The information processing apparatus may further include a controlling part for controlling the information processing apparatus in the operation range stored by the operation range obtaining part.

The information processing apparatus may further include a user information inputting part for user information about a user who uses the information processing apparatus, and an authenticating part for authenticating the user information that has been input by the user information inputting part. When the user information has been authenticated by the authenticating part, the controlling part may control the information processing apparatus in the operation range stored by the operation range obtaining part. When the user information has not been authenticated by the authenticating part, the controlling part may not control the information processing apparatus.

The information processing apparatus may further include a display controlling part for controlling a display of the operation range of each user stored by the operation range obtaining part. The device attribute information may include a device ID of the electronic device, a type of the electronic device, or information about a function of the electronic device. The network may be composed of an IEEE 1394 serial bus. The information processing apparatus may be connected to the network in such a manner that the information processing apparatus is capable of being disconnected therefrom.

A third information processing method of the present invention is an information processing method for an information processing apparatus connected to another information processing apparatus through a network, including the steps of (a) storing device attribute information about the local information processing apparatus, (b) transmitting the device attribute information stored at the device attribute information storing step (a) to the other information processing apparatus through the network corresponding to a request of the other information processing apparatus, and (c) obtaining the operation range of each user from the other information processing apparatus through the network and storing the obtained operation range.

A third record medium of the present invention is a record medium for storing a program that causes a computer to perform an information processing method for an information processing apparatus connected to another information processing apparatus through a network, including the steps of (a) storing device attribute information about the local information processing apparatus, (b) transmitting the device attribute information stored at the device attribute information storing step (a) to the other information processing apparatus through the network corresponding to a request of the other information processing apparatus, and (c) obtaining the operation range of each user from the other information processing apparatus through the network and storing the obtained operation range.

A third program of the present invention is a program that causes a computer connected to another information processing apparatus through a network to perform the steps of (a) storing device attribute information about the local information processing apparatus, (b) transmitting the device attribute information stored at the device attribute information storing step (a) to the other information processing apparatus through the network corresponding to a request of the other information processing apparatus, and (c) obtaining the operation range of each user from the other information processing apparatus through the network and storing the obtained operation range.

According to a third information processing apparatus, a third information processing method, and a third information processing program of the present invention, an operation range of each user is obtained from another information processing apparatus through a network. The obtained operation range is stored.

A fourth information processing apparatus of the present invention is an information processing apparatus, including an operation range assigning part for assigning an operation range of each user, and a controlling part for controlling the information processing apparatus in the operation range assigned by the operation range assigning part.

The information processing apparatus may further include an owner registering part for registering the user as an owner who is capable of using all the operation range of the information processing apparatus. The operation range assigning part may assign the operation range of each user for the information processing apparatus corresponding to a command issued by the owner registered by the owner registering part.

The information processing apparatus may further include a user name inputting part for inputting a user name of a user who uses the information processing apparatus, an authenticating part for authenticating the user name that has been input by the user name inputting part, and an owner determining part for determining whether or the user name authenticated by the authenticating part is the owner registered by the owner registering part. When the determined result of the owner determining part represents that the user name is not the owner registered by the owner registering part, the operation range assigning part may not permit the user to assign the operation range of each user.

The information processing apparatus may further include a guest registering part for permitting a particular user as a guest to use all or part of the operation range of the information processing apparatus, and an anonymous registering part for permitting an anonymous user to use all or part of the operation range of the information processing apparatus.

The information processing apparatus may further include a user name inputting part for inputting a user name of a user who uses the information processing apparatus, an authenticating part for authenticating the user name that has been input by the user name inputting part, and a guest determining part for determining whether or not the user name authenticated by the authenticating part is the guest registered by the guest registering part. When the determined result of the guest determining part represents that the user name is the guest registered by the guest registering part, the operation range assigning part may assign all or part of the operation range to the guest.

The information processing apparatus may further include an anonymous determining part for determining whether or not an anonymous user has been registered by the anonymous registering part when the determined result of the guest determining part represents that the user name is not the guest registered by the guest registering part. When the determined result of the anonymous determining part represents that the anonymous user has been registered by the anonymous registering part, the operation range assigning part may assign all or part of the operation range to the anonymous user. When the determined result of the anonymous determining part represents that the anonymous user has not been registered by the anonymous registering part, the controlling part may not control the information processing apparatus.

The information processing apparatus may further include a user registering part for registering user information about a user who uses the information processing apparatus, a user information inputting part for inputting the user information about the user who uses the information processing apparatus, and an authenticating part for authenticating whether or not the user information that has been input by the user information inputting part has been registered by the user registering part. When the user information has been authenticated by the authenticating part, the controlling part may read the operation range corresponding to the user information from the operation range assigning part and controls the information processing apparatus in the operation range. When the user information has not been authenticated by the authenticating part, the controlling part may not control the information processing apparatus.

The information processing apparatus may further include a display controlling part for controlling a display of the operation range of each user stored by the operation range assigning part.

A fourth information processing method of the present invention is an information processing method, including the steps of (a) assigning an operation range of each user, and (b) controlling the information processing apparatus in the operation range assigned at the operation range assigning step.

A fourth record medium of the present invention is an record medium for storing a program that causes a computer to perform an information processing method, the method including the steps of (a) assigning an operation range of each user, and (b) controlling the information processing apparatus in the operation range assigned at the operation range assigning step.

A fourth program of the present invention is an program that causes a computer for performing an information processing method to execute the steps of (a) assigning an operation range of each user, and (b) controlling the information processing apparatus in the operation range assigned at the operation range assigning step.

According to a fourth information processing apparatus, a fourth information processing method, and a fourth information processing program of the present invention, an operation range of each unit is assigned. The information processing apparatus is controlled in the assigned operation range.

A first network system of the present invention is a network system for mutually connecting a first electronic device and a second electronic device through a network. The first electronic device includes a device attribute information obtaining part for obtaining device attribute information about the second electronic device therefrom through the network, an operation range assigning part for assigning an operation range of each user of the second electronic device corresponding to the device attribute information obtained by the device attribute information obtaining part and storing the assigned operation range, and a controlling part for controlling the second electronic device through the network in the operation range assigned by the operation range assigning part. The second electronic device includes a device attribute information storing part for storing device attribute information about the second electronic device, and a device attribute information transmitting part for transmitting the device attribute information stored in the device attribute information storing part to the first electronic device through the network corresponding to a request of the first electronic device.

According to a first network system of the present invention, a first electronic device obtains device attribute information from a second electronic device through a network. The first electronic device assigns an operation range of each user for the second electronic device corresponding to the obtained device attribute information. The first electronic device controls the second electronic device in the assigned operation range through the network. The second electronic device stores device attribute information thereof. The second electronic device sends the stored device attribute information to the first electronic device through the network corresponding to a request therefrom.

A second network system of the present invention is a network system for mutually connecting a first electronic device and a second electronic device through a network. The first electronic device includes a device attribute information obtaining part for obtaining device attribute information about the second electronic device therefrom through the network, an operation range assigning part for assigning an operation range of each user of the second electronic device corresponding to the device attribute information obtained by the device attribute information obtaining part and storing the assigned operation range, and a transferring part for transferring the operation range of each user stored by the operation range assigning part to the second electronic device through the network. The second electronic device includes a device attribute information storing part for storing device attribute information about the second electronic device, a device attribute information transmitting part for transmitting the device attribute information stored in the device attribute information storing part to the first electronic device through the network corresponding to a request of the first electronic device, and an operation range obtaining part for obtaining the operation range of each user from the first electronic device through the network.

According to a second network system of the present invention, a first electronic device obtains device attribute information from a second electronic device through a network. The first electronic device assigns an operation range of each user for the second electronic device corresponding to the obtained device attribute information. The first electronic device transfers the assigned operation range to the second electronic device through the network. The second electronic device obtains the operation range of each user transferred from the first electronic device through the network and stores the operation range.

These and other objects, features and advantages of the present invention will become more apparent in light of the following Detailed Description of the Preferred Embodiments and the Drawings.

DESCRIPTION OF THE DRAWINGS

FIG. 5 is a schematic diagram for explaining the definition of a user table;

FIG. 6 is a schematic diagram for explaining the definition of a device access table;

FIG. 7 is a schematic diagram for explaining the definition of an access right table;

FIG. 30 is a schematic diagram showing a display example of a guest management GUI screen according to another embodiment of the present invention.

DETAILED DESCRIPTION OF THE PREFERRED EMBODIMENTS

Figure 1:
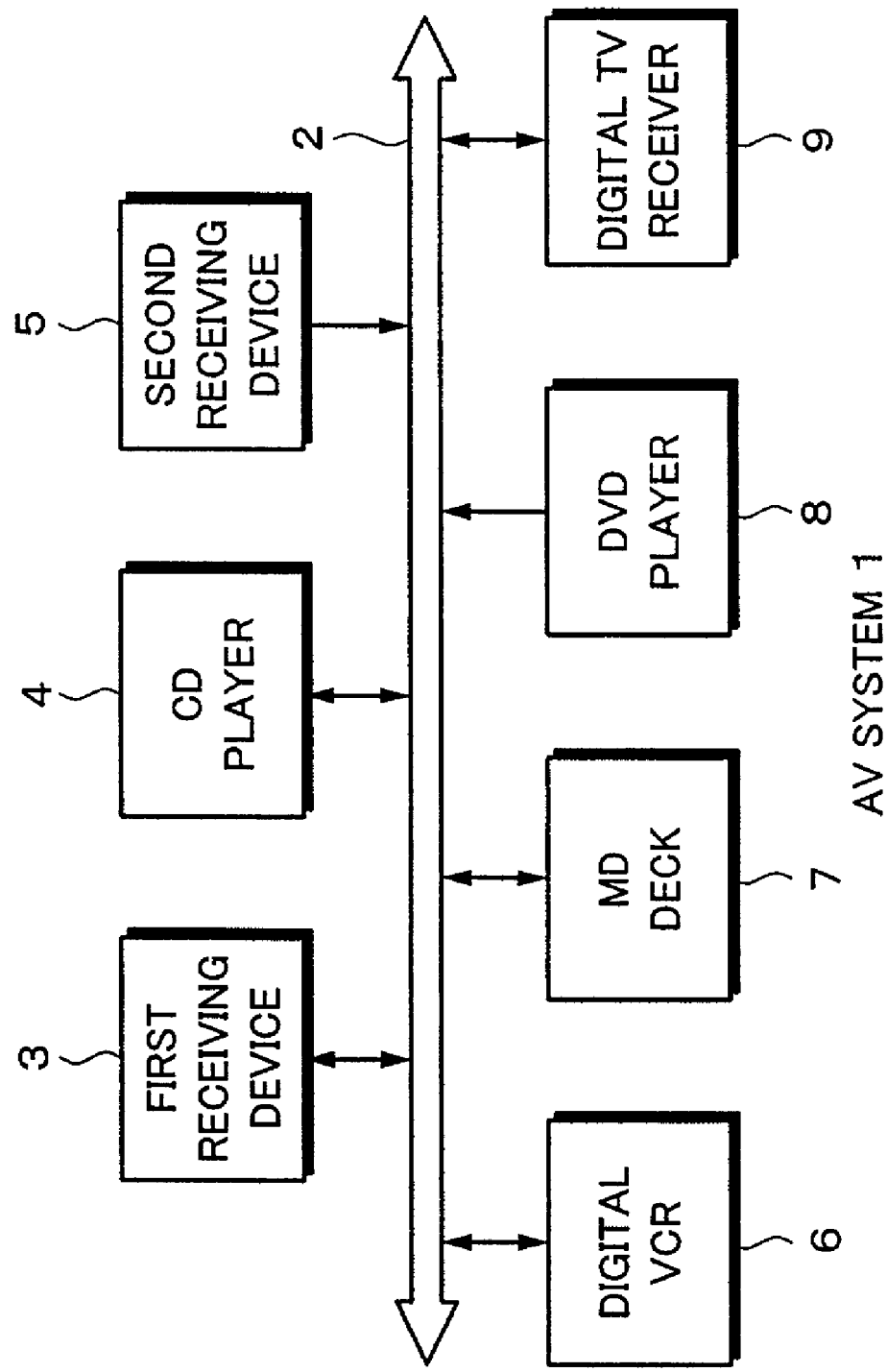
FIG. 1 is a block diagram showing an example of the structure of an AV system according to the present invention.

Next, with reference to the accompanying drawings, an embodiment of the present invention will be described. FIG. 1 is a block diagram showing an example of the structure of an AV system 1 according to the present invention. In the AV system 1, a number of digital AV devices are mutually connected through an IEEE 1394 bus 2 corresponding to a HAVi network. Examples of the digital AV devices are a first receiving device (IRD: Integrated Receiver Decoder) 3, a CD (Compact Disc) player 4, a second receiving device (IRD) 5, a digital video cassette recorder 6, an MD (Mini Disc) deck 7, a DVD (Digital Versatile Disc) player 8, and a digital television receiver 9.

In the AV system 1, among those digital AV devices, the first receiving device 3, the digital VCR 6, the MD deck 7, and the DVD player 8 are devices manufactured by A Company, whereas the second receiving device 5 (as a controlling device), the CD player 4 and the digital TV receiver 9 (as controlled devices) are devices manufactured by B Company. In the HAVi network system, it is recommended to structure a controlling system using devices manufactured by the same manufacturer because of their characteristics. However, when necessary, a controlling device manufactured by a particular manufacturer can communicate with HAVi devices manufactured by another manufacturer.

In the AV system 1, the first receiving device 3 as a controlling device of the number of digital AV devices controls the digital VCR 6, the MD deck 7, and the DVD player 8 as controlled devices. When necessary, the first receiving device 3 controls the CD player 4 and the digital TV receiver 9 as other controlled devices using a HAVi mechanism (that will be described later).

In the AV system 1, the second receiving device 5 as a controlling device of the number of digital AV devices controls the CD player 4 and the digital TV receiver 9 as controlled devices. When necessary, the second receiving device 5 controls the digital VCR 6, the MD deck 7, and the DVD player 8 as the other controlled devices using the HAVi mechanism.

Figure 2:
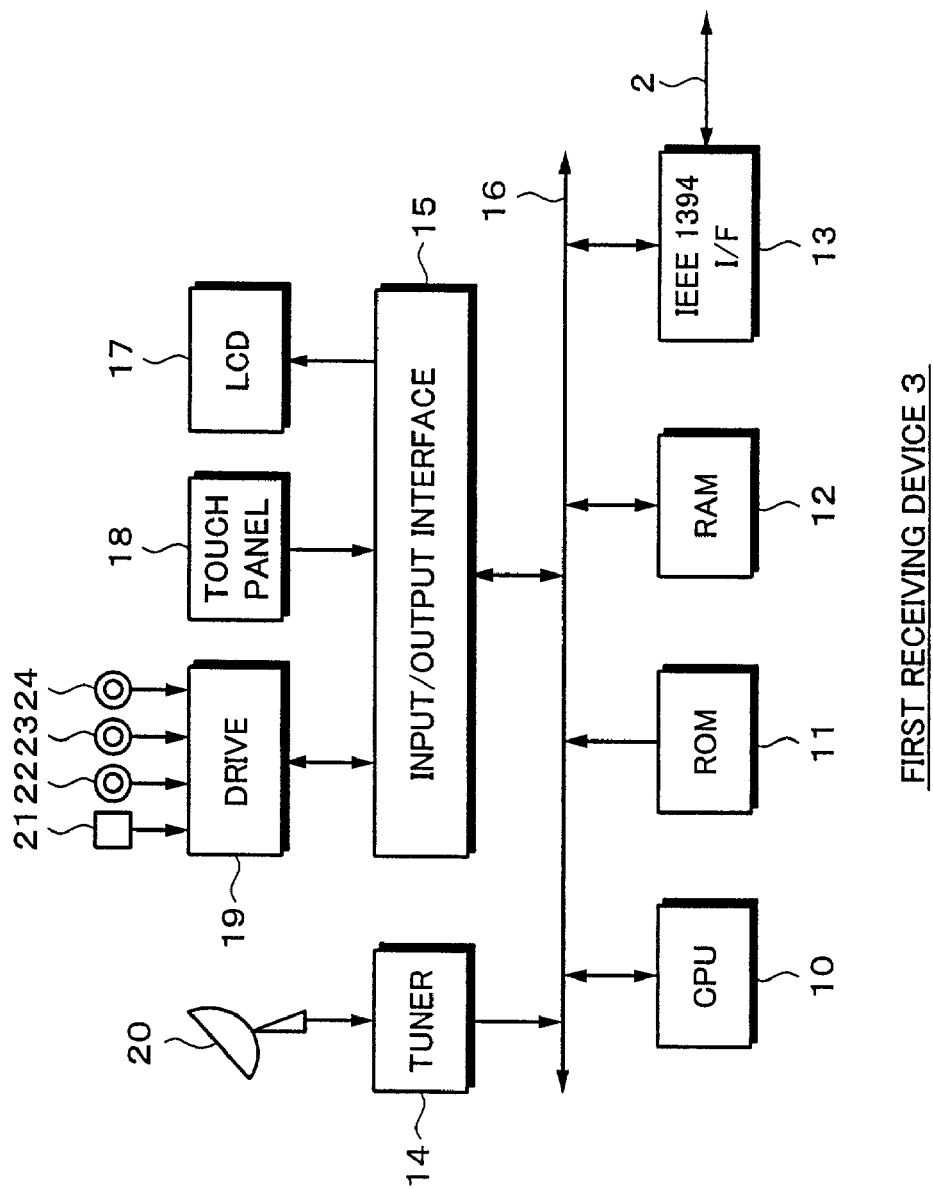
FIG. 2 is a block diagram showing an example of the internal structure of a first receiving device shown in FIG. 1.

In such a case, as shown in FIG. 2, the first receiving device 3 as a controlling device includes a CPU (Central Processing Unit) 10, a ROM (Read Only Memory) 11, a RAM (Random Access Memory) 12, an IEEE 1394 interface (I/F) 13, a tuner 14, an input/output interface 15, an inner bus 16, an LCD (Liquid Crystal Display) 17, a touch panel 18, and a drive 19. The ROM 11 stores various types of programs. The RAM 12 is a work memory for the CPU 10. The CPU 10, the ROM 11, the RAM 12, the IEEE 1394 interface 13, the tuner 14, and the input/output interface 15 are connected through the inner bus 16. The LCD 17, the touch panel 18, and the drive 19 are connected to the input/output interface 15.

The CPU 10 sends display picture data corresponding to the programs stored in the ROM 11 to the LCD 17 through the inner bus 16 and the input/output interface 15. As a result, the LCD 17 displays desired information.

When necessary, the CPU 10 controls the tuner 14 and the IEEE 1394 interface 13 corresponding to various types of instructions that are input through the touch panel 18 and corresponding to commands that are input from the CD player 4 and the digital TV receiver 9 (see FIG. 1) as digital AV devices through the IEEE 1394 bus 2.

In other words, when the first receiving device 3 receives a reception instruction/command for a particular channel from the touch panel 18 through the input/output interface 15, the tuner 14 tunes the desired channel from the reception signal received by an antenna 20 and sends an obtained video signal and an obtained audio signal to the CD player 4 and the digital TV receiver 9 as digital AV devices through the inner bus 16, the IEEE 1394 interface 13, and the IEEE 1394 bus 2.

The drive 19 reads data or a program from a magnetic disc 21, an optical disc 22, a magneto-optical disc 23, or a semiconductor memory 24. The program includes a program executed by the IEEE 1394 interface 13. The drive 19 supplies the data or program to the RAM 12 or the IEEE 1394 interface 13 through the input/output interface 15 and the inner bus 16.

Since the structure of the second receiving device 5 is the same as the first receiving device 3 shown in FIG. 2, the description of the second receiving device 5 is omitted.

Figure 3:
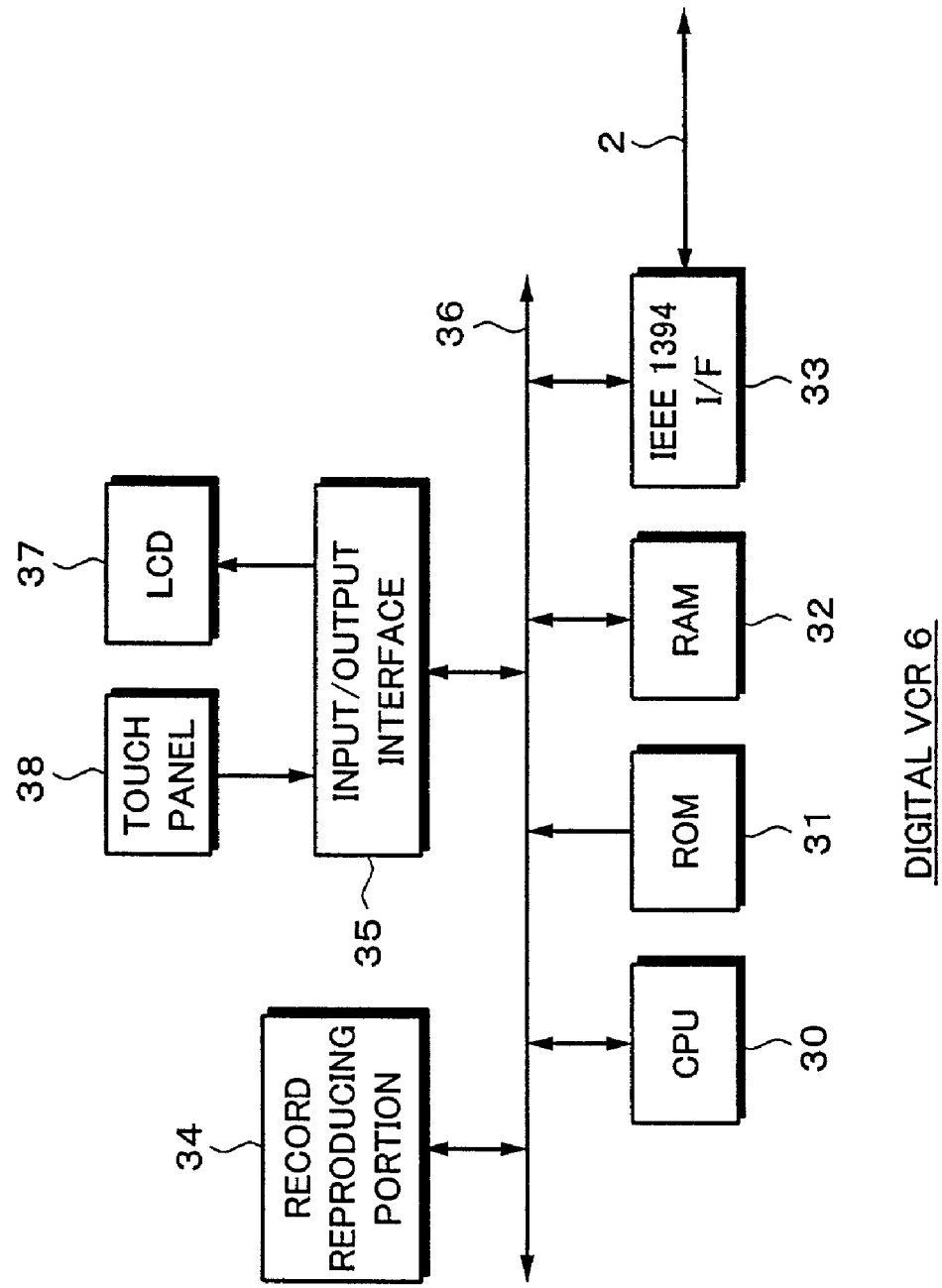
FIG. 3 is a block diagram showing an example of the internal structure of a digital VCR shown in FIG. 1.

As shown in FIG. 3, the digital VCR 6 as a controlled device includes a CPU 30, a ROM 31, a RAM 32, an IEEE 1394 interface 33, a record reproducing portion 34, an input/output interface 35, an inner bus 36, an LCD 37, and a touch panel 38. The CPU 30, the ROM 31, the RAM 32, the IEEE 1394 interface 33, the record reproducing portion 34, and the input/output interface 35 are connected through the inner bus 36. The touch panel 38 and the LCD 37 are connected to the input/output interface 35.

In this example, the CPU 30 sends display picture data corresponding to a program stored in the ROM 31 to the LCD 37 through the inner bus 36 and the input/output interface 35. As a result, the LCD 37 displays required information.

When necessary, the CPU 30 controls the record reproducing portion 34 corresponding to various types of instructions that are input through the touch panel 38 and commands that are input from the first receiving device 3 or the second receiving device 5 (see FIG. 1) through the IEEE 1394 bus 2.

In other words, when the digital VCR 6 receives a record instruction, a video signal and an audio signal that are received from the first receiving device 3 to the second receiving device 5 or the MD deck 7 to the digital TV receiver 9 as a digital AV device through the IEEE 1394 bus 2 to the record reproducing portion 34 through the IEEE 1394 interface 33 and the inner bus 36. The record reproducing portion 34 records the received video signal and audio signal to a magnetic tape (not shown) through the inner bus 36.

When the digital VCR 6 receives a reproduction instruction, the record reproducing portion 34 reproduces a video signal and an audio signal from a magnetic tape (not shown) and sends the reproduced video signal and audio signal to the first receiving device 3, the second receiving device 5, the MD deck 7, or the digital TV receiver 9 as a relevant digital AV device through the inner bus 36 and the IEEE 1394 bus 2.

In such a manner, in the AV system 1, the first receiving device 3 to the digital TV receiver 9 as digital AV devices mutually transmit and receive data through the IEEE 1394 bus 2. In addition, the first receiving device 3 or the second receiving device 5 as a controlling device sends various types of control instructions to the CD player 4, the digital VCR 6, the MD deck 7, the DVD player 8, or the digital TV receiver 9 as a controlled device so as to control a relevant device.

Figure 4:
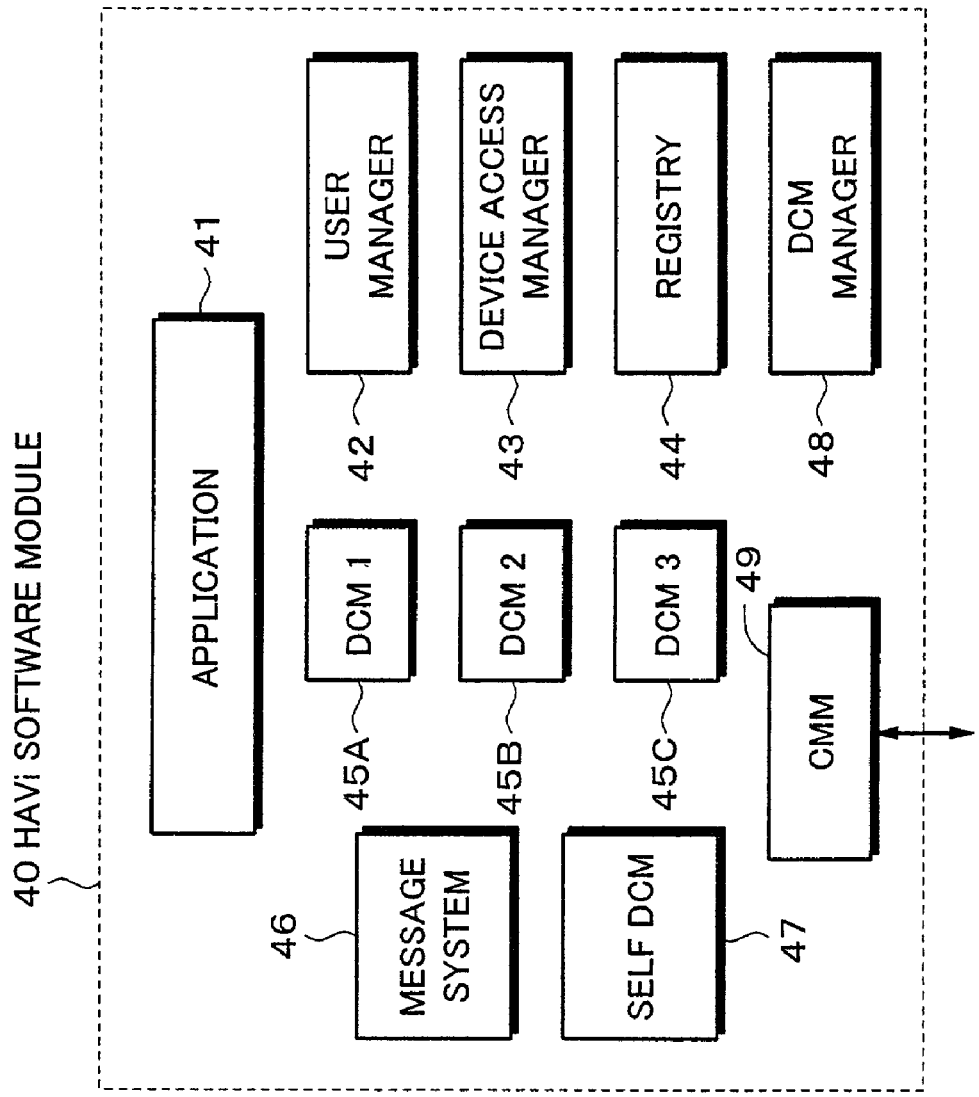
FIG. 4 is a schematic diagram for explaining an HAVi software module.

FIG. 4 is a schematic diagram showing an example of a software stack of the first receiving device 3 shown in FIG.

1. Referring to FIG. 4, the software stack of the first receiving device 3 as a controlling device is composed of a HAVi software module 40.

The HAVi software module 40 is composed of a number of elements that are an application 41, a user manager 42, a device access manager 43, a registry 44, a number of device control modules (DCMs) 45A to 45C, a message system 46, a self device control module (self DCM) 47, a DCM manager 48, and a communication media manager (CMM) 49.

The application 41 stores various types of graphical user interfaces (GUIs) and various types of application programs that activate the user manager 42 and the device access manager 43.

The device control modules (DCMs) 45A to 45C of the HAVi software module 40 are generated corresponding to controlled devices. Next, the generating process will be described.

When a device is connected to the system or the power of the device is turned on, a bus reset signal takes place. As a result, the topology of the device connections is restructured. In addition, the first receiving device 3 whose device class is FAV (Full AV Device) successively uploads the device control modules (DCMs) 45A to 45C for the digital VCR 6, the MD deck 7, and the DVD player 8 (manufactured by the same manufacturer as the first receiving device 3) to the HAVi software module 40 through the IEEE 1394 bus 2 corresponding to the install priority of the device control modules (DCMs) and installs them thereto.

The message system 46 obtains software element IDs (SEIDs) of the device control modules 45A to 45C and registers the SEIDs and device attribute information of controlled devices corresponding to the device control modules 45A to 45C to the registry 44.

When the application 41 sends various types of instructions to the individual software elements through the user manager 42 and the device access manager 43, the software elements execute processes for the device control modules 45A to 45C corresponding to the instructions and return execution results as return values to the application 41.

The registry 44 is a directory service of the HAVi software. The registry 44 can recognize all software elements in the home network. The registry 44 stores device attribute information (as list data) of all the digital AV devices on the home network that are the first receiving device 3 to the digital TV receiver 9.

The user manager 42 is a software element for managing users who control the first receiving device 3 to the digital TV receiver 9 as the digital AV devices on the home network. The user manager 42 manages a table shown in FIG. 5 (this table is referred to as user table). The user table shown in FIG. 5 has "user" and "password" fields. A password is a character string (composed of alphanumeric characters) designated by a user. The password is used to identify the user.

The user manager 42 is composed of application program interfaces (APIs) that are Add User, Remove User, Set User, and Get User. The Add User is used for adding a user to the user table. The Remove User is used for deleting a user from the user table. The Set User is used for setting a current user name. The Get User is used for obtaining a current user name. When the Add User and the Remove User are used, a user name and an encoded password are required.

The device access manager 43 is a software element for managing a table shown in FIG. 6 (this table is referred to as device access table). The device access table has "device (controlled device)", "user attribute", "user name", and "access ID (control ID of controlled device)" fields. The "access ID" field is composed of a table shown in FIG. 7 (this table is referred to as access right table). The access right table has "ID" and "access right" fields. The access right table correlates IDs and access rights. The access rights are "all controls prohibited", "reproduction function control", "record function control", "power on/off control", and "all controls").

The "user attribute" field of the device access table has three attributes that are "owner", "guest", and "anonymous". The "owner" represents all control access rights for a designated device. The "guest" represents an access right for a designated device. The "guest" is designated by the "owner" of a designated device to a particular user. The "anonymous" represents an access right for a designated device. The "anonymous" is designated by the "owner" of a designated device to an anonymous use (other than the "guest").

The device access manager 43 is composed of application program interfaces (APIs) that are "Set Owner", "Has Owner", "Add Write", "Remove Write", "Can Access", and "Allow Access". The "Set Owner" is used for setting an owner. The "Has Owner" is used for obtaining an owner name as a user attribute (determining whether an owner has been designated). The "Add Write" is used for adding an access right of a user. The "Remove Write" is used for removing the access right of a user. The "Can Access" is used for determining whether or not a designated device can be accessed and for obtaining the result. The "Allow Access" is used for allowing a designated user to access a designated device.

The "Set Owner" requires a device ID and a user name. Each of the "Add Write", "Remove Write", "Can Access", and "Allow Access" requires a device ID, a user name, and an access name.

The communication media manager (CMM) 49 is a software element for allowing the CPUs of the first receiving device 3 to the digital TV receiver 9 as the number of digital AV devices to communicate in the network. The message system 46 is a software element that controls messages with which all the software elements that are the application 41, the user manager 42, the device access manager 43, and the device control modules (DCMs) 45A to 45C to mutually communicate.

Since the structure of the HAVi software stack of the second receiving device 5 is the same as the structure of the HAVi software stack (see FIG. 4) of the first receiving device 3, the description thereof is omitted.

Next, the operation of the preferred embodiment of the present invention will be described.

First of all, with reference to a flow chart shown in FIG. 8, a user login process will be described. When the user operates the touch panel 18 of the first receiving device 3, a relevant application program gets started and executes the user login process.

Figure 9:
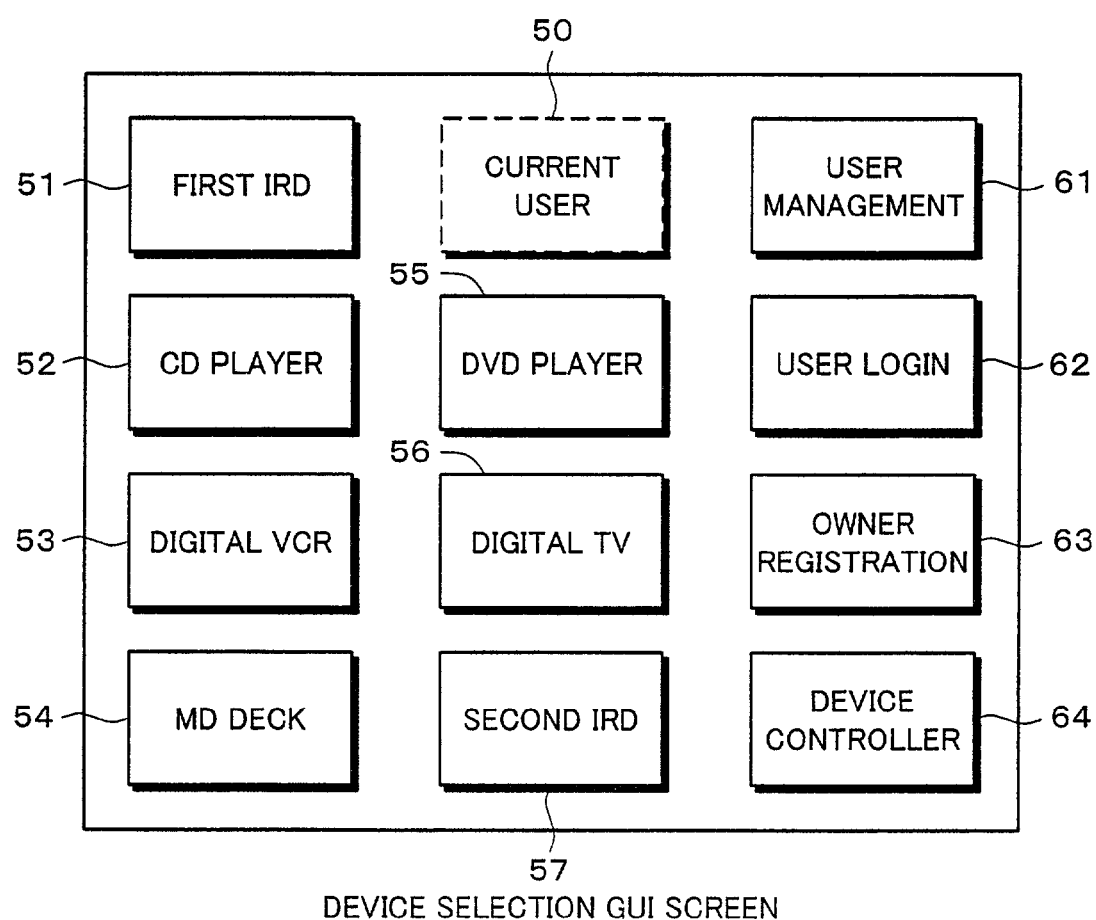
FIG. 9 is a schematic diagram showing a display example of a device selection GUI screen.

At step S1, the CPU 10 causes a GUI screen as shown in FIG. 9 to be displayed as a window on the LCD 17 (hereinafter, the GUI screen is referred to as device selection GUI screen).

On the device selection GUI screen showing in FIG. 9, device selection buttons 51 to 57 corresponding to the first receiving device 3 to the digital TV receiver 9 that are HAVi devices connected on the same network are displayed as array members. In addition, on the right of the screen, a user management button 61, a user login button 62, an owner registration button 63, and a device controller button 64 are displayed as array members. Moreover, at the upper center position of the screen, a current user name 50 is displayed as an array member.

When the user presses the user login button 62 on the right of the device selection GUI screen (see FIG. 9), the flow advances to step S2. At step S2, the CPU 10 causes a GUI screen as shown in FIG. 10 of the user interfaces of the application 41 of the HAVi software module 40 to be displayed as a window on the LCD 17 (the GUI screen is referred to as login GUI screen).

Figure 10:
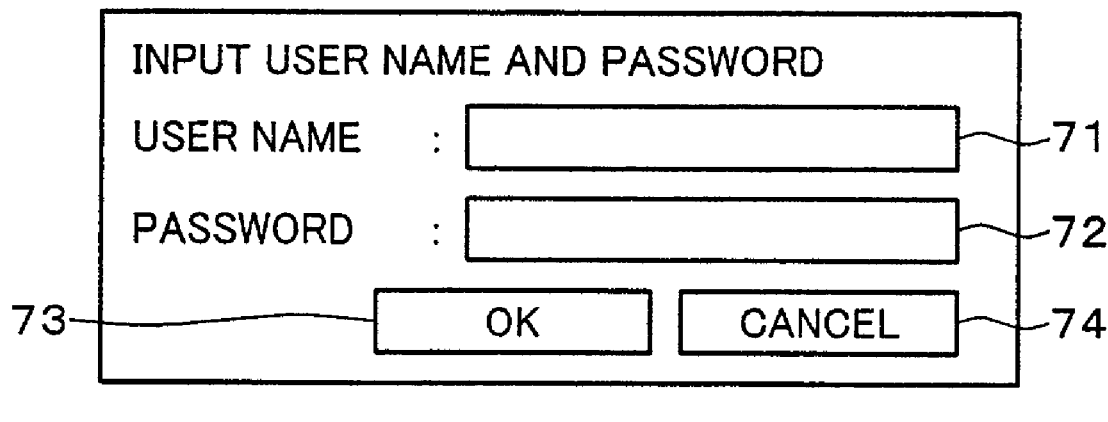
FIG. 10 is a schematic diagram showing a display example of a login GUI screen.

At step S2, the user inputs a user name in a user name field 71 on the login GUI screen (see FIG. 10). Thereafter, the user inputs a predetermined password in a password field 72 and presses an OK button 73. Thereafter, the flow advances to step S3. At step S3, the CPU 10 determines whether or not the input user name is a user registered in the user table managed by the user manager 42.

When the user presses a cancel button 74 on the login GUI screen, the CPU 10 exits from the login GUI screen to the device selection GUI screen (see FIG. 9) regardless of whether or not the user has input a user name and a password.

At step S3, when the determined result at step S3 is Yes (namely, the input user name is a user registered in the user table managed by the user manager 42), the flow advances to step S4. At step S4, the CPU 10 authenticates the input password and determines whether or not the input password is correct. When the determined result at step S4 is Yes (namely, the input password is correct), the flow advances to step S5. At step S5, the CPU 10 updates the current user name 50 on the device selection GUI screen (see FIG. 9) with the input user name and causes the input user name to be displayed.

When the determined result at step S4 is No (namely, the input password is incorrect), the flow advances to step S6. At step S6, the CPU 10 causes a message screen "PASSWORD IS INCORRECT. LOGIN FAILED." to be displayed as a window on the LCD 17. When the user presses an OK button 81 on the message screen, the CPU 10 causes the device selection GUI screen to be displayed again (see FIG. 9).

When the determined result at step S3 is No (namely, the input user name is not a user registered in the user table managed by the user manager 42), the flow advances to step S7. At step S7, the CPU 10 causes a message screen "UNKNOWN USER. WILL YOU REGISTER YOUR USER NAME AS NEW USER?" to be displayed as a window on the LCD 17.

Figure 13:
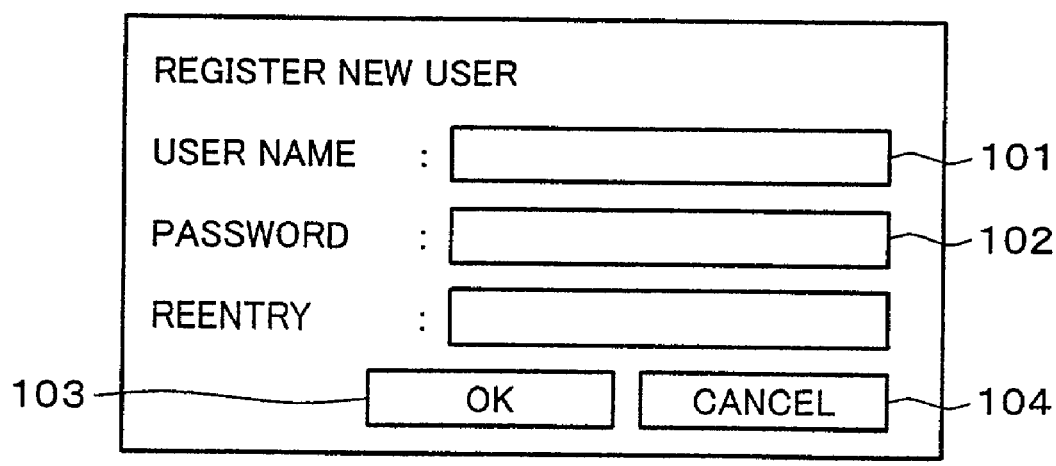
FIG. 13 is a schematic diagram showing a display example of a new user registration GUI screen.

At step S8, the CPU 10 determines whether or not the user want to register the user name as a new user (namely, the CPU 10 determines whether or not the user has pressed a Yes button 91 on the message screen). When the determined result at step S8 is Yes (namely, the user wants to register the user name as a new user), the flow advances to step S9. At step S9, the CPU 10 causes a GUI screen as shown in FIG. 13 to be displayed as a window on the LCD 17 (this screen is referred to as new user registration screen). On the other hand, when the determined result at step S8 is No (namely, the user has pressed a No button 92 on the message screen), the CPU 10 exits from the message screen. In this case, the CPU 10 immediately completes the process without existing to the device selection GUI screen. Thus, the CPU 10 does not execute the login process.

At step S9, when the user inputs a user name in a user name field 101 on the new user registration GUI screen (see FIG. 13), inputs a predetermined password, and presses an OK button 103, the flow advances to step S10. When the user presses a cancel button 104 on the new user registration GUI screen, the CPU 10 exits from the new user registration GUI screen to the device selection GUI screen regardless of whether or not user has input the user name and the password.

At step S10, the CPU 10 authenticates the input password and determines whether or not the input password is correct. When the determined result at step S10 is Yes (namely, the input password is correct), the flow advances to step S11. At step S11, the CPU 10 adds the input user name to the user table (see FIG. 5). In addition, the CPU 10 updates the current user name 50 with the input user name and causes the input user name to be displayed.

Figure 11:
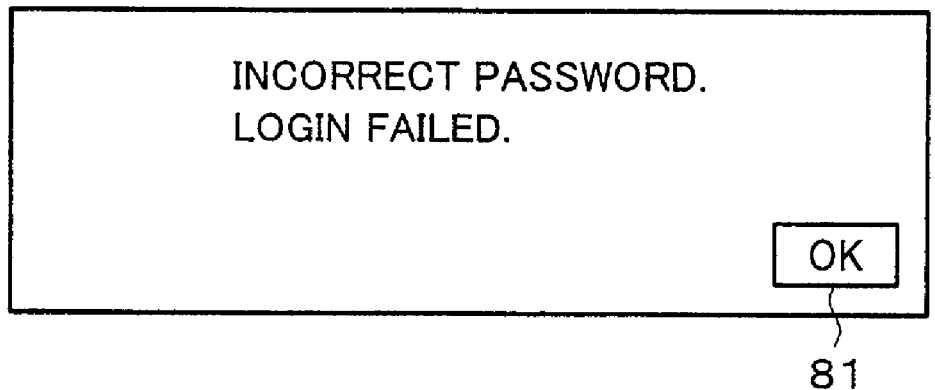
FIG. 11 is a schematic diagram showing a display example of a message screen.
Figure 12:
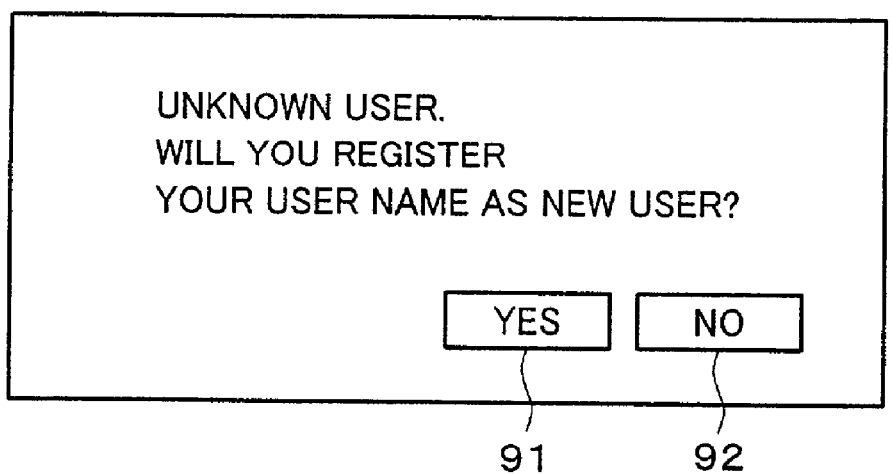
FIG. 12 is a schematic diagram showing a display example of a message screen.

When the determined result at step S10 is No (namely, the password is incorrect), the flow advances to step S12. At step S12, the CPU 10 causes a message screen as shown in FIG. 11 to be displayed as a window on the LCD 17. Thereafter, when the user presses an OK button 81 on the message screen, the CPU 10 causes the device selection GUI screen to be displayed again and completes the process.

In such a manner, in the first receiving device 3, the CPU 10 causes the device selection GUI screen (see FIG. 9) to be displayed on the LCD 17 corresponding to user's operation. Thus, the above described user login process can be performed on the device selection GUI screen.

Figure 14B:
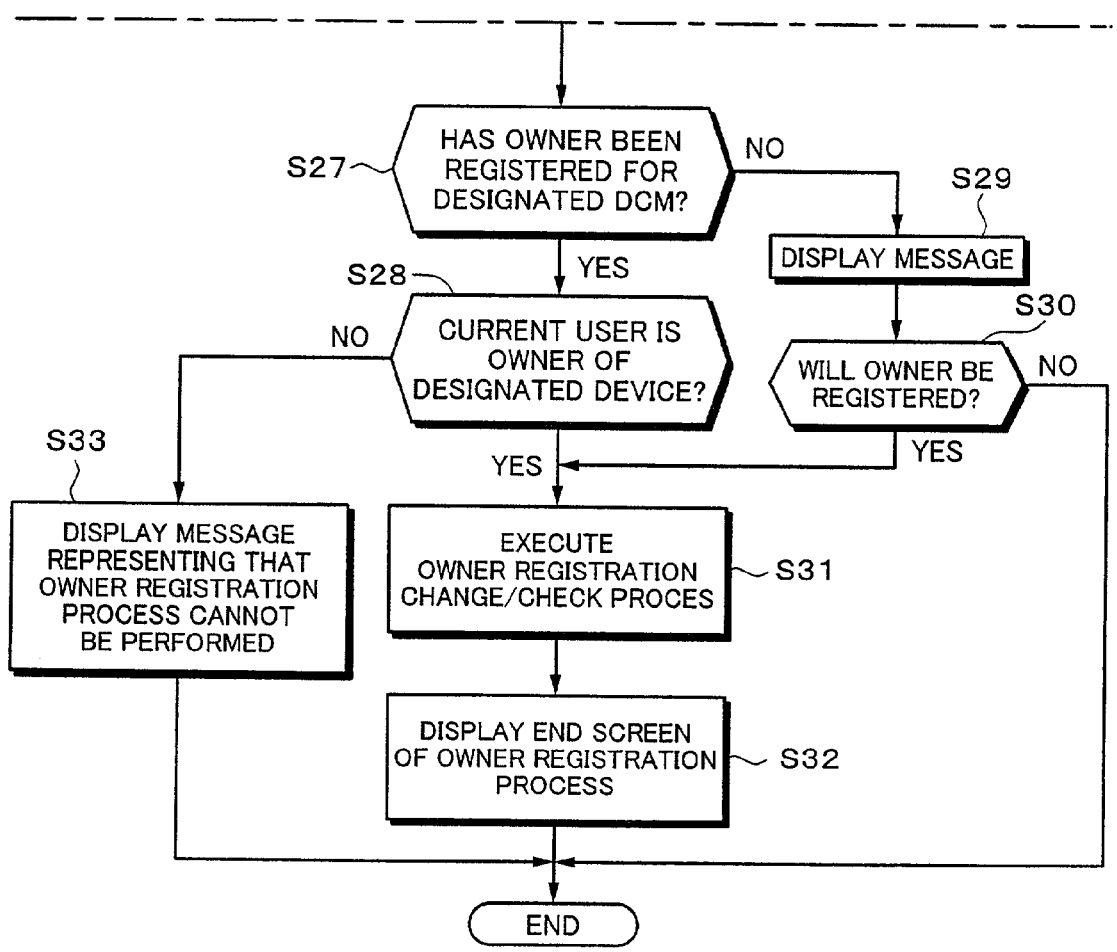
FIG. 14 is a flow chart for explaining an owner registration process.

Next, with reference to a flow chart shown in FIG. 14, the owner registration process will be described. When the user operates the touch panel 18 of the first receiving device 3, an owner registration application gets started and executes the owner registration process.

Figure 8:
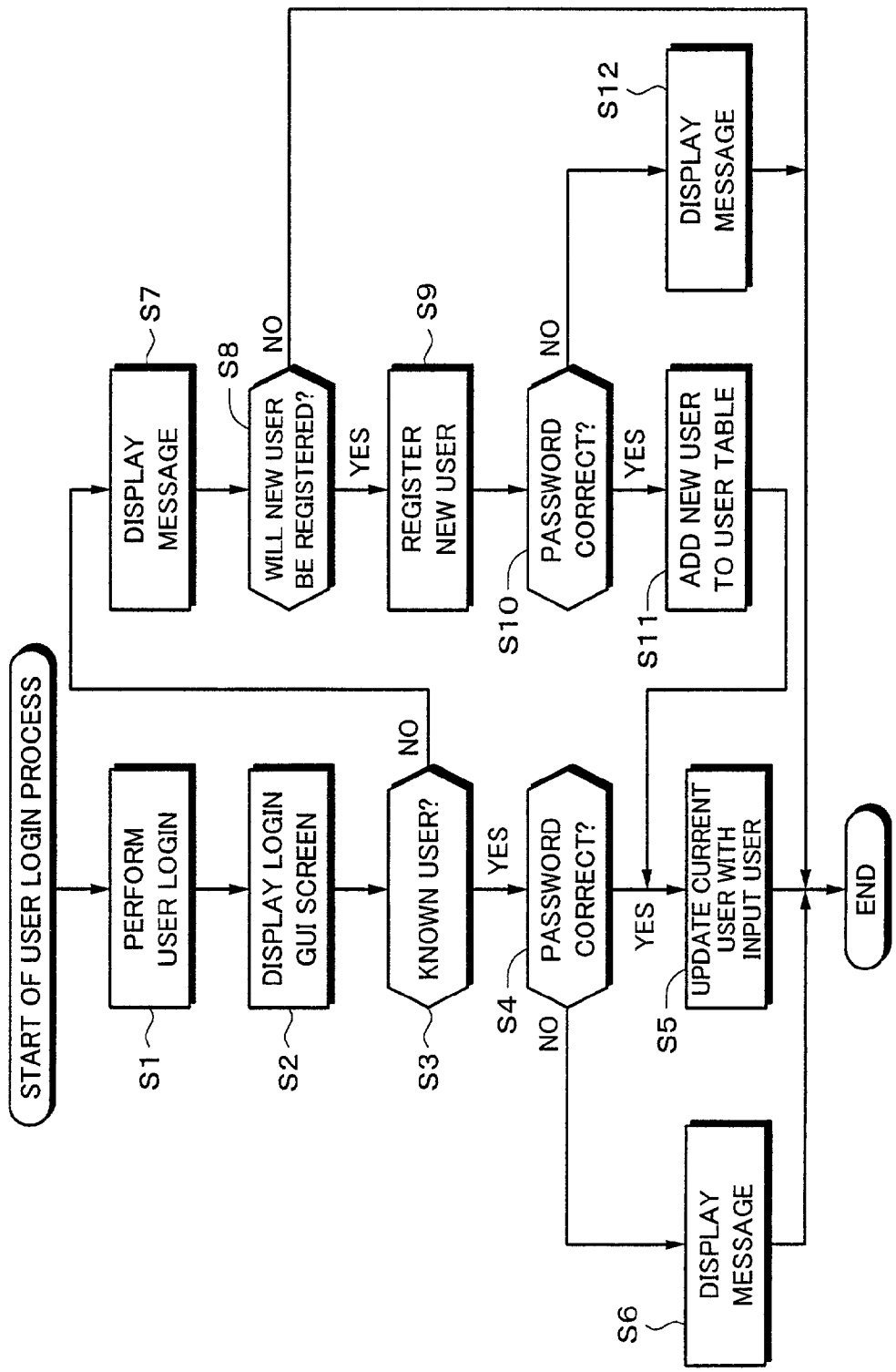
FIG. 8 is a flow chart for explaining a user login process.

At step S21, the CPU 10 performs the above described user login process (see FIG. 8). Thereafter, the flow advances to step S22. At step S22, the CPU 10 causes the device selection GUI screen (see FIG. 9) of the user interfaces of the application 41 to be displayed as a window on the LCD 17.

At step S23, when the user designates one of the device selection buttons 51 to 57 corresponding to the first receiving device 3 to the digital TV receiver 9 and then presses the owner registration button 63, the CPU 10 performs the owner registration process for the designated device (the first receiving device 3 to the digital TV receiver 9). In other words, the user manager 42 of the HAVi software module 40 (see FIG. 4) of the CPU 10 registers the input user name to the device access table of the device control module (DCM) corresponding to the designated device (the first receiving device 3 to the digital TV receiver 9) as an owner to the device access table.

Thereafter, at step S24, the CPU 10 inquires the registry 44 of the HAVi software module 40 about device attribute information corresponding to the designated device (the CD player 4 to the digital TV receiver 9) and obtains the device attribute information.

At step S25, the CPU 10 determines whether or not the device control module corresponding to the obtained device attribute information is a device control module as a control object of the second receiving device 5 rather than the first receiving device 3 (namely, the device control module is a remote DCM). When the determined result at step S25 is No (namely, the device control module is not a remote DCM), the CPU determines that the device control module is a local DCM. Thereafter, the flow advances to step S27. At step S27, the CPU 10 determines whether or not an owner has been registered for the device control module as a control object.

In other words, at step S25, when the target controlled device is a control object of the first receiving device 3, the application 41 inquires the registry 44 about the software element ID (SEID) obtained from the message system 46 and obtains device attribute information from the registry 44. On the other hand, when the target controlled device is not a control object of the first receiving device 3 (namely, the target controlled device is a remote controlled device), the registry 44 inquires a registry of another controlling device (for example, the second receiving device 5) about device attribute information and obtains it from the registry.

At step S25, when the determined result at step S25 is No (namely, the obtained device control module is a local DCM), the device access manager 43 of the HAVi software module 40 sends an owner registration check command of the "Has Owner" to the registry 44 and obtains a message that represents that an owner has been registered from the registry 44. Thereafter, the flow advances to step S27.

When the determined result at step S25 is Yes (namely, the obtained device control module is a remote DCM) (in this example, the second receiving device 5 has a device control module for the selected controlled device), the flow advances to step S26. At step S26, the application 41 inquires the device access manager of the HAVi software module of the second receiving device 5 whether an owner has been registered and obtains the result. Thereafter, the flow advances to step S27.

This is because due to the concept of distributed objects of the HAVi software, a local software element (namely, a control object) is managed by a local controlling device (for example, FAV, IAV (Intermediate AV Device), or the like). Thus, the application 41 inquires the local registry about a software element ID for device attribute information. Alternatively, the application 41 inquires a remote registry about a software element ID for device attribute information through the local registry.

At step S27, the CPU 10 determines whether or not an owner has been registered corresponding to the determined results at step S25 or S26. When the determined result at step S27 is Yes (namely, an owner has been registered), since an owner has been registered for the designated device (the first receiving device 3 to the digital TV receiver 9), the flow advances to step S28.

On the other hand, when the determined result at step S27 is No (namely, an owner has not been registered), since an owner has not been registered for the designated device (the first receiving device 3 to the digital TV receiver 9), the flow advances to step S29. At step S29, the CPU 10 causes a message screen "OWNER HAS NOT BEEN REGISTERED FOR THE DEVICE. WHEN NECESSARY, PRESS OK BUTTON. WHEN NOT NECESSARY, PRESS CANCEL BUTTON." to be displayed as a window on the LCD 17. Thereafter, the flow advances to step S30.

Figure 15:
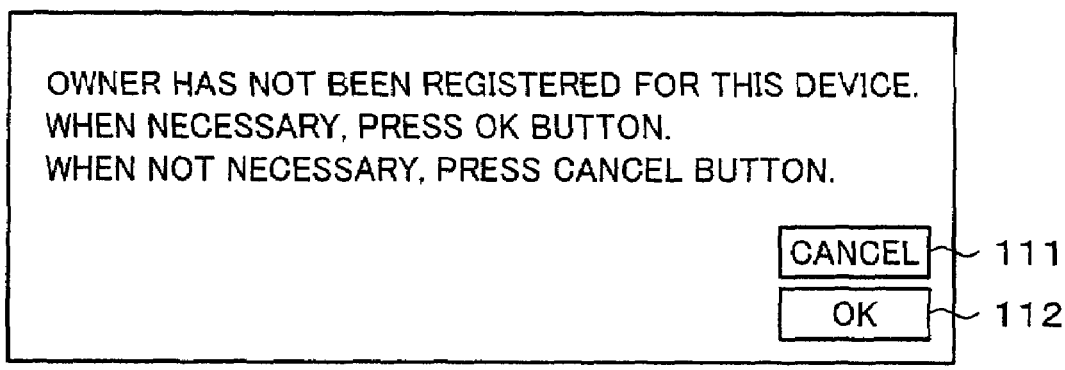
FIG. 15 is a schematic diagram showing a display example of a message screen.

At step S30, the CPU 10 determines whether or not the user wants to register an owner (namely, the user has pressed an OK button 112 of the message screen shown in FIG. 15). When the determined result at step S30 is Yes (namely, the user wants to register an owner and an OK button 112 has been pressed), the flow advances to step S31. On the other hand, when the determined result at step S30 is No (namely, the user does not want to register an owner and the OK button 112 has not been pressed), the CPU 10 determines that a cancel button 111 on the message screen has been pressed and exits from the message screen to the device selection GUI screen (see FIG. 9).

At step S28, the CPU 10 determines whether or not the user who has been currently logged in is an owner of the designated device (the first receiving device 3 to the digital TV receiver 9). When the determined result at step S28 is No (namely, the user is not an owner), since only the owner of the designated device can change the owner thereof, the flow advances to step S33. On the other hand, when the determined result at step S28 is Yes (namely, the user who has been logged in is an owner of the designated device), since the user can perform an owner registration change process (including an owner registration check process), the flow advances to step S31. The determination process at step S28 is performed by comparing the user name and the password that have been input when the user has logged in with those that have been input in the owner registration process.

Figure 16:
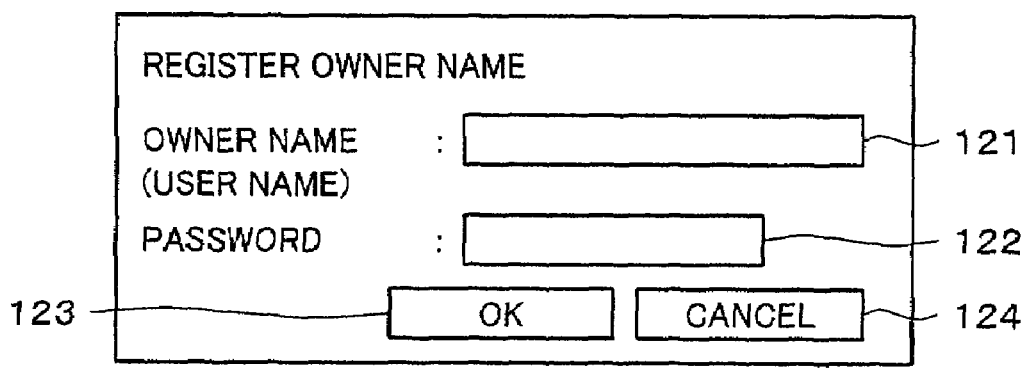
FIG. 16 is a schematic diagram showing a display example of an owner registration GUI screen.
Figure 17:
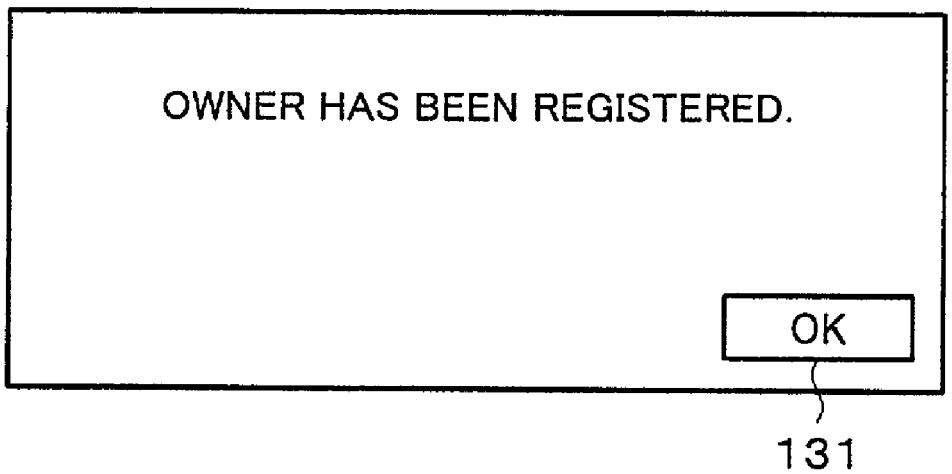
FIG. 17 is a schematic diagram showing a display example of a message screen.

At step S31, the CPU 10 causes a GUI screen as shown in FIG. 16 to be displayed as a window on the LCD 17 (this screen is referred to as owner registration GUI screen). When the user inputs an owner name (user name) in a user name field 121 on the owner registration GUI screen, inputs a predetermined password in a password field 122, and presses an OK button 123, the CPU 10 registers the device ID, the user attribute (owner), and the access right (ID that represents all control rights) to the device access table (see FIG. 6). In addition, the CPU 10 registers the input password and the user name to the user table (see FIG. 5). When the input owner name and the input user name have been registered, they are not redundantly registered. Thereafter, the flow advances to step S32. At step S32, the CPU 10 causes a message screen "OWNER HAS REGISTERED." as shown in FIG. 17 to be displayed as a window on the LCD 17.

When the user presses a cancel button 124 on the owner registration GUI screen, the CPU 10 exits from the owner registration GUI screen to the device selection GUI screen (see FIG. 9).

When the user presses an OK button 131 on the message screen (see FIG. 17), the CPU 10 causes the device selection GUI screen (see FIG. 9) to be displayed.

Figure 18:
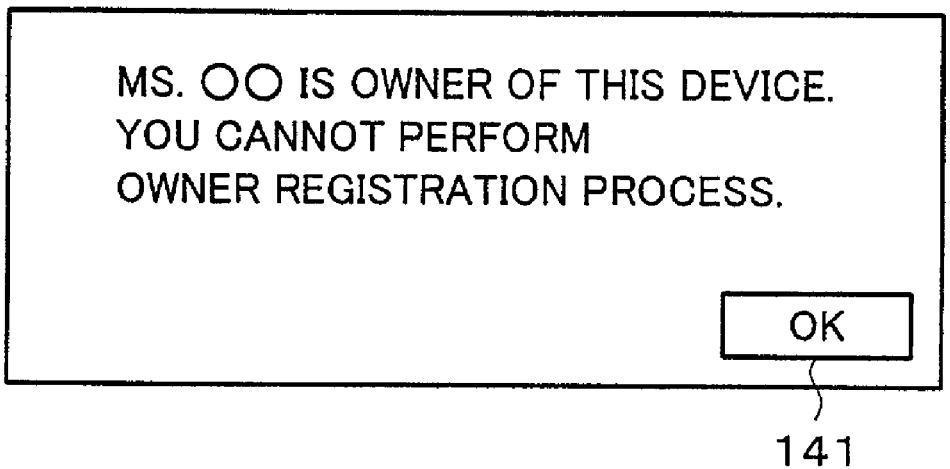
FIG. 18 is a schematic diagram showing a display example of a message screen.

At step S33, the CPU 10 causes a message screen "MS. OO IS THE OWNER OF THIS DEVICE. YOU CANNOT PERFORM OWNER REGISTRATION PROCESS." as shown in FIG. 18 to be displayed on the LCD 17. When the user presses an OK button 141, the CPU 10 causes the device selection GUI screen (see FIG. 9) to be displayed again. Thereafter, the CPU 10 completes the process.

Figure 19:
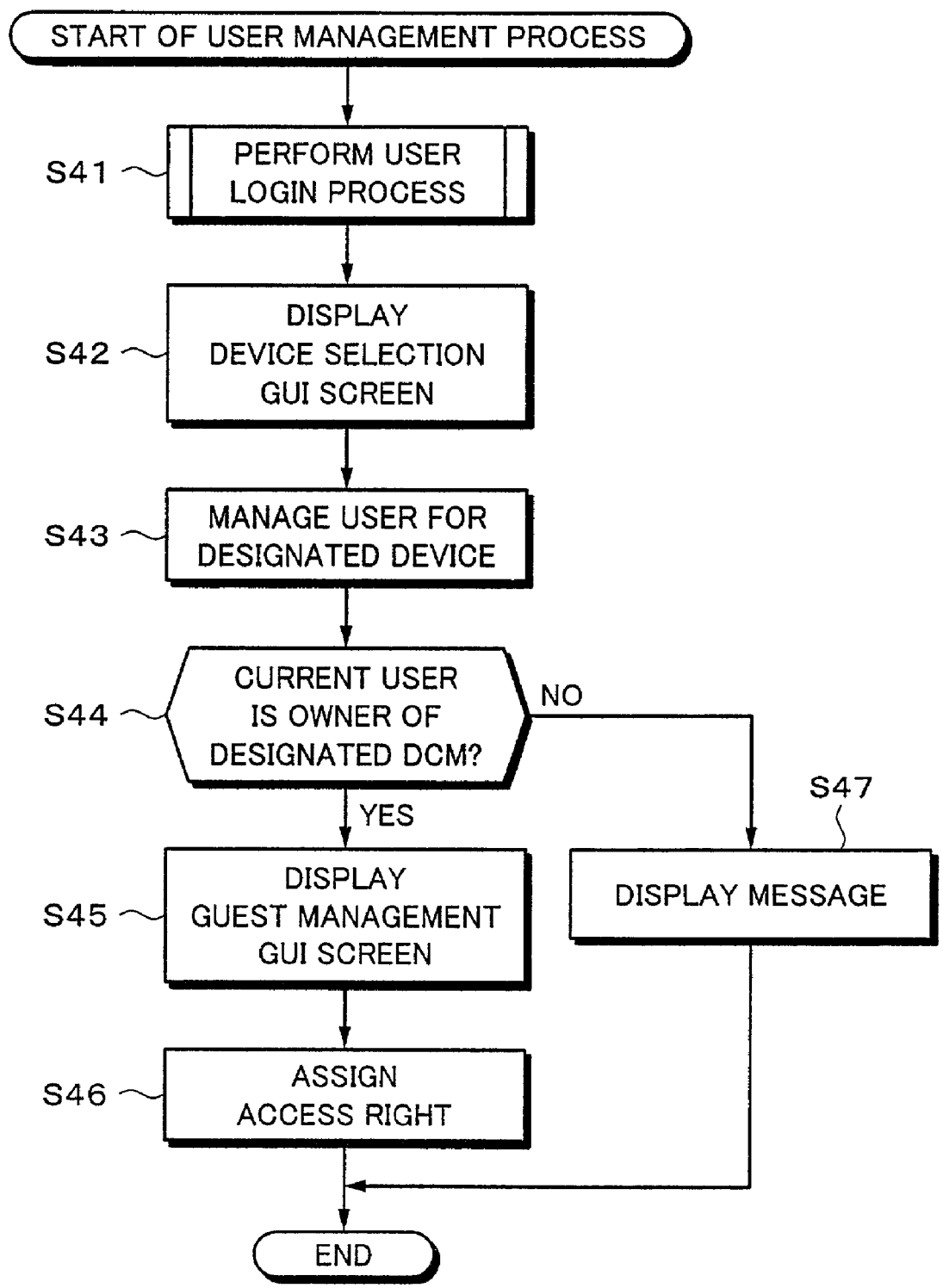
FIG. 19 is a flow chart for explaining a user management process.

Next, with reference to FIG. 19, a user management process will be described. When the user operates the touch panel 18 of the first receiving device 3, a user management application gets started and executes the user management process.

At step S41, the CPU 10 executes the above described user login process (see FIG. 8). Thereafter, the flow advances to step S42. At step S42, the CPU 10 causes the device selection GUI screen (see FIG. 9) of the user interfaces of the application 41 to be displayed as a window on the LCD 17.

At step S43, when the user designates a device (the first receiving device 3 to the digital TV receiver 9) through the device selection GUI screen (the device selection buttons 51 to 57) and presses the user management button 61 at the upper right position of the screen, the CPU 10 performs a user management process for the device control module (DCM) of the HAVi software module 40 (see FIG. 4) corresponding to the designated device (the first receiving device 3 to the digital TV receiver 9).

At step S44, the CPU 10 determines whether or not the current user is an owner of the designated device (the first receiving device 3 to the digital TV receiver 9). In reality, the CPU 10 reads the owner name of the user attribute of the designated device (the first receiving device 3 to the digital TV receiver 9) from the device access table and determines whether or not the designated owner name matches the current user name.

When the determined result at step S44 is Yes (namely, the designated owner name matches the current user name), since the current user is an owner of the designated device (the first receiving device 3 to the digital TV receiver 9), the flow advances to step S45. At step S45, the CPU 10 causes a GUI screen (as shown in FIG. 20) of the user interfaces of the application 41 of the HAVi software module 40 to be displayed as a window on the LCD 17 (this screen is referred to as guest management GUI screen).

Figures 20, 21:
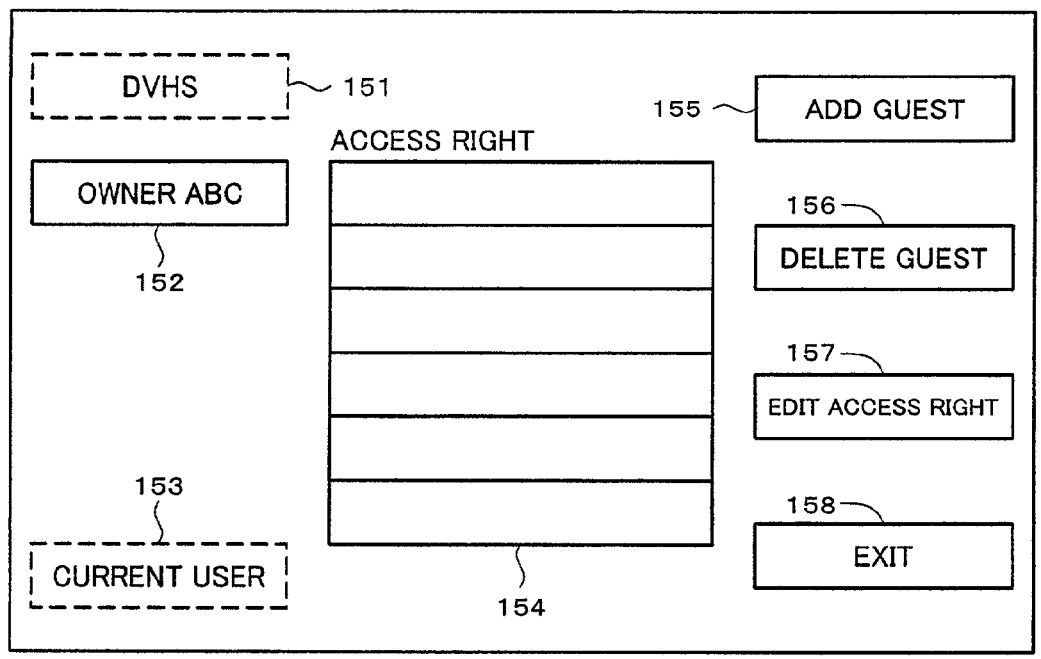
FIG. 20 is a schematic diagram showing a display example of a guest management GUI screen.
FIG. 21 is a schematic diagram showing a display example of a pull-down menu screen of a user list button.

A device type name 151 of the designated device (the first receiving device 3 to the digital TV receiver 9) is displayed at an upper left position on the guest management GUI screen shown in FIG. 20. Below the device type name 151, a user list button 152 is displayed. The user list button 152 lists user attributes and user names. A current user name (namely, an owner name) 153 is displayed at a lower left position of the screen. At a center position of the screen, an access right (device control content name) field 154 corresponding to a user name designated by the user list button 152 is displayed. In addition, on the right side of the screen, a guest add button 155, a guest delete button 156, an access right edit button 157, and an exit button 158 are displayed as array members.

Thereafter, the flow advances to step S46. At step S46, the CPU 10 performs the access right assignment process on the guest management GUI screen.

Next, the access right registration (assignment) process for a particular user (guest) performed by an owner will be described.

When the current user (namely, an owner) presses the user list button 152 on the guest management GUI screen, a pull-down menu screen 152A corresponding to the device type name 151 of the device (the first receiving device 3 to the digital TV receiver 9) is displayed as shown in FIG. 21. The pull-down menu screen 152A lists registered user names and attributes thereof. When the current user (namely, the current owner) presses a desired user name on the pull-down menu screen 152A, a user attribute (guest) and a user name (guest name) corresponding to the user (guest) that is read from the device access table (see FIG. 6) are displayed in the user list button 152. In addition, the control content name of the device assigned for the user is displayed in the access right field 154.

In the case of the example shown in FIG. 20, since the access right for a guest has not been registered, the user attribute of the user (namely, the owner) and the owner name "owner ABC" are displayed in the user list button 152.

Figure 22:
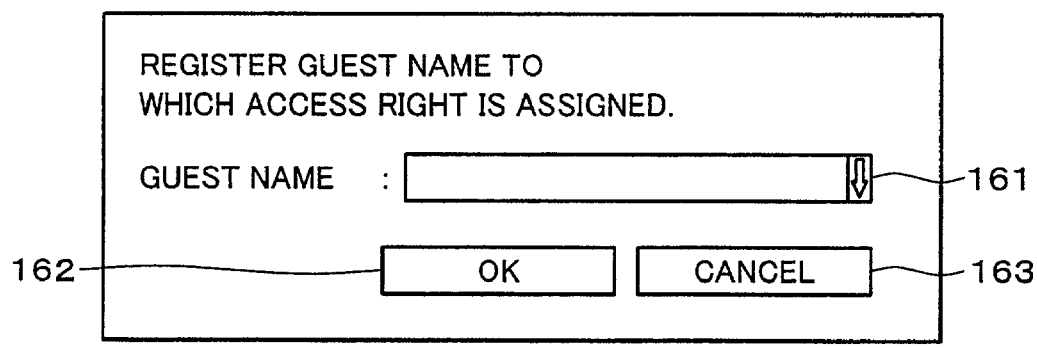
FIG. 22 is a schematic diagram showing a display example of a guest name registration GUI screen.

On the guest management GUI screen, when the owner presses the guest add button 155, the CPU 10 causes a GUI screen as shown in FIG. 22 of the user interfaces of the application 41 of the HAVi software module 40 to be displayed as a window on the LCD 17 (this screen is referred to as guest name registration GUI screen).

When the owner inputs a desired guest name in a guest name field 161 and presses an OK button 162 on the guest name registration GUI screen, the CPU 10 adds the input guest name to the user list button 152, assigns the access right for the guest name corresponding to the access right field 154 displayed for the input guest name, and registers them to the device access table (see FIG. 6). When the owner presses a cancel button 163, the CPU 10 exits to the guest management GUI screen (see FIG. 20) without adding the guest name to the device access table (see FIG. 6).

Figure 23:
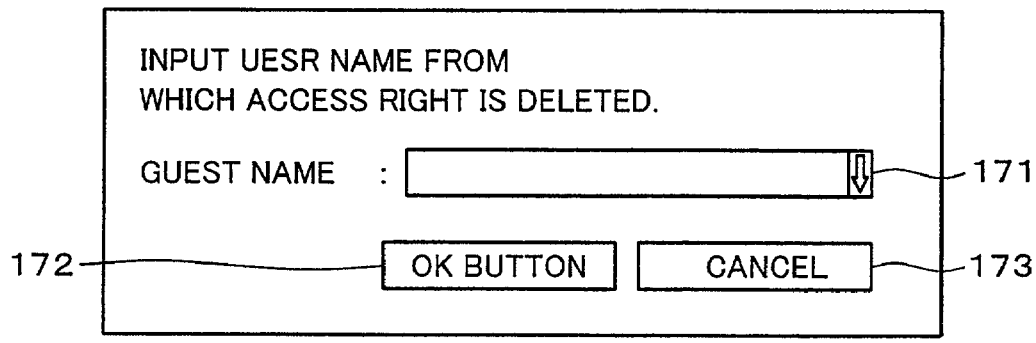
FIG. 23 is a schematic diagram showing a display example of a guest name delete GUI screen.

When the owner presses the guest delete button 156 on the guest management GUI screen, the CPU 10 causes a GUI screen as shown in FIG. 23 of the user interfaces of the application 41 of the HAVi software module 40 to be displayed as a window on the LCD 17 (this screen is referred to as guest name delete GUI screen).

When the owner inputs a desired guest name in a guest name file 171 and presses an OK button 172 on the guest name delete GUI screen, the CPU 10 deletes the input guest name from the user list button 152 and the device access table (see FIG. 6). When the owner presses a cancel button 173, the CPU 10 exits to the guest management GUI screen (see FIG. 20) without deleting the guest name.

Figure 24:
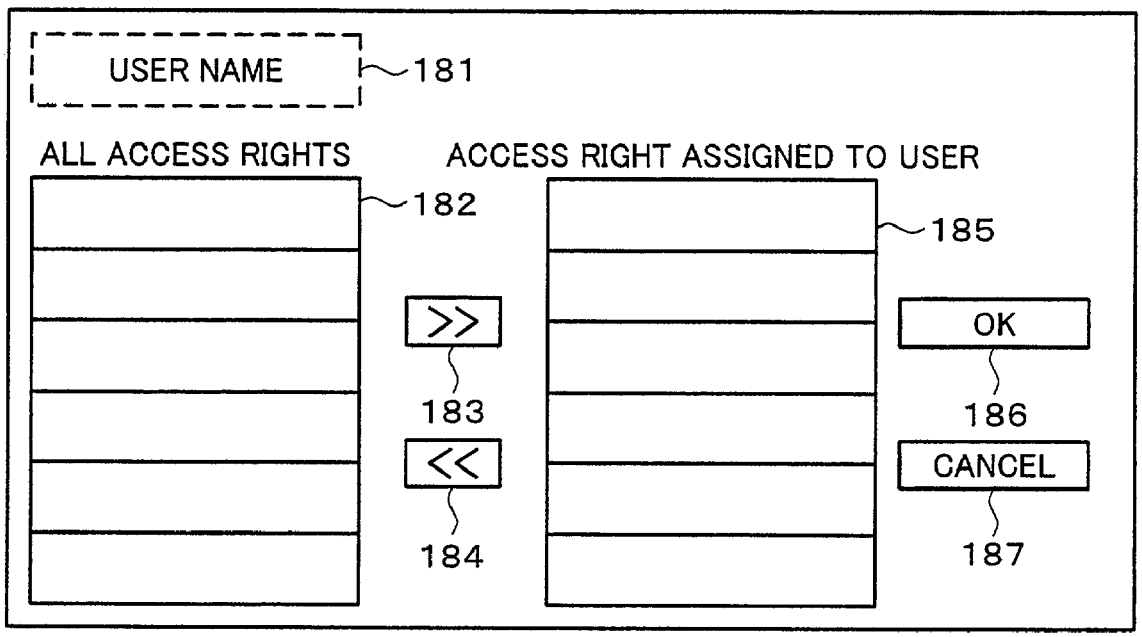
FIG. 24 is a schematic diagram showing a display example of an access right assignment GUI screen.

When the owner presses the access right edit button 157 on the guest management GUI screen, the CPU 10 causes a GUI screen as shown in FIG. 24 of the user interfaces of the application 41 of the HAVi software module 40 to be displayed as a window on the LCD 17 (this screen is referred to as access right assignment GUI screen).

A user name 181 on the access right assignment GUI screen shown in FIG. 24 displays a user name (guest name) that has been selectively displayed in the user list button 152 on the guest management GUI screen (see FIG. 20) just before the access right edit button 157 has been pressed. An access right list button 185 displays the content of the access right field 154 of the guest management GUI screen. An all access right button 182 displays all the content of the access right table (see FIG. 7) of the device corresponding to the device type name 151 on the guest management GUI screen.

When the current owner designates a desired access right from the all access right button 182 and presses a function add button 183 ">>", the CPU 10 adds the access right to an access right field 185. On the other hand, when the current owner presses a function delete button 184 "<<", the CPU 10 deletes the access right from the access right list button 185.

When the owner presses an OK button 186, the CPU 10 updates the access right information and exits to the guest management GUI screen (see FIG. 20) in which the access right information has been updated. In other words, the CPU 10 causes the access right list button 185 that represents the access right assigned to the user (guest) to be redisplayed in the access right field 154 on the guest management GUI screen. In addition, the CPU 10 performs the update process for the device access table (see FIG. 6). On the other hand, when the current owner presses a cancel button 187, the CPU 10 exits to the guest management GUI screen (see FIG. 20) without changing the access right assigned to the user.

Next, the access right registration process for an anonymous user will be described. The access right registration process is performed by an owner.

As was described above, when an owner presses the user list button 152 on the guest management GUI screen (see FIG. 20), the CPU 10 causes the pull-down menu screen 152A (see FIG. 21) to be displayed. When the current user (current owner) selects "anonymous" from a number of users displayed on the pull-down menu screen 152A, the user list button 152 displays the user attribute of the user (anonymous user) that has been read from the device access table (see FIG. 6) and the control content name for the device assigned to the user (in the case of the example shown in FIG. 6, the access ID assigned to the anonymous user is 3) to the access right field 154. When the owner presses the access right edit button 157, the CPU 10 causes the access right assignment GUI screen (see FIG. 24) to be displayed as a window on the LCD 17. On the screen, the owner adds or deletes the access right.

In such a manner, the user can register and/or check a particular user (owner or guest) or an anonymous user having a particular access right for a designated device of the first receiving device 3 to the digital TV receiver 9 connected to the IEEE 1394 bus 2 on the guest management GUI screen (see FIG. 20) on the LCD 17.

At step S46, the CPU 10 registers a particular user as a guest or an anonymous using having a particular access right for a designated device of the number of devices (the first receiving device 3 the digital TV receiver 9) connected to the IEEE 1394 bus 2 on the guest management GUI screen (see FIG. 20) displayed on the LCD 17 of the first receiving device 3. Thereafter, when the user presses the exit button 158 on the guest management GUI screen, the CPU 10 exits to the device selection GUI screen (see FIG. 9).

When the determined result at step S44 is No (namely, the designated owner name does not match the current user name), since the current user is not the owner of the designated device of the owner of the designated device has not been registered, the flow advances to step S47.

Figure 25:
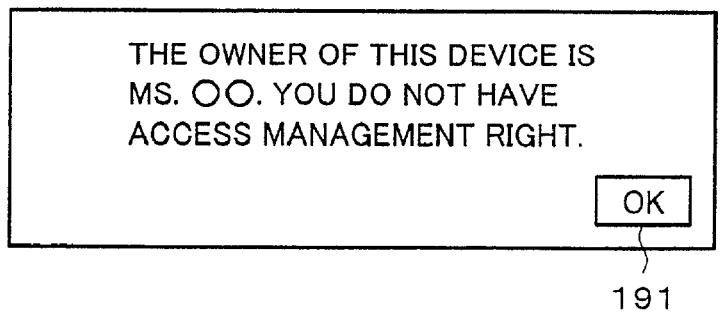
FIG. 25 is a schematic diagram showing a display example of a message screen.
Figure 26:
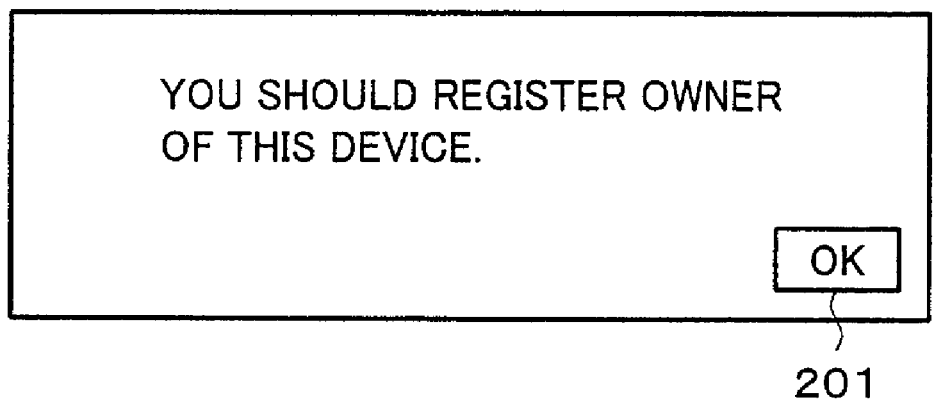
FIG. 26 is a schematic diagram showing a display example of a message screen.

When the determined result at step S47 is No (namely, the current user is not the owner of the designated device), the CPU 10 causes a message screen "THE OWNER OF THIS DEVICE IS MS. OO. YOU DO NOT HAVE ACCESS MANAGEMENT RIGHT." as shown in FIG. 25 to be displayed as a window on the LCD 17. When the owner of the designated device has not been registered, the CPU 10 causes a message screen "THE OWNER OF THIS DEVICE SHOULD BE REGISTERED." as shown in FIG. 26 to be displayed as a window on the LCD 17. When the user presses an OK button 191 (see FIG. 25) or an OK button 201 (see FIG. 26), the CPU 10 exits to the device selection GUI screen (see FIG. 9) and completes the process.

Figure 27:
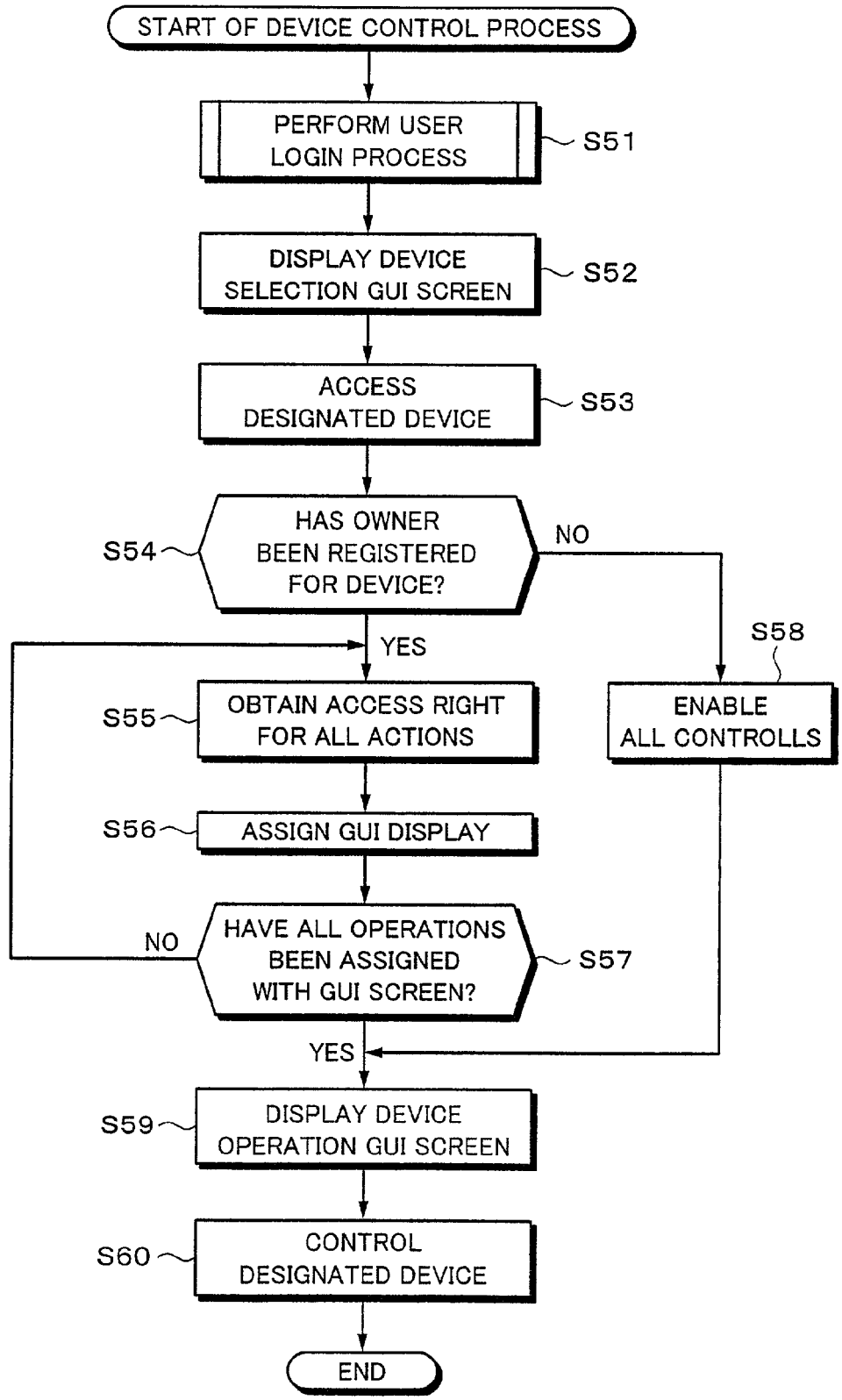
FIG. 27 is a flow chart for explaining a device control process.
Figure 28:
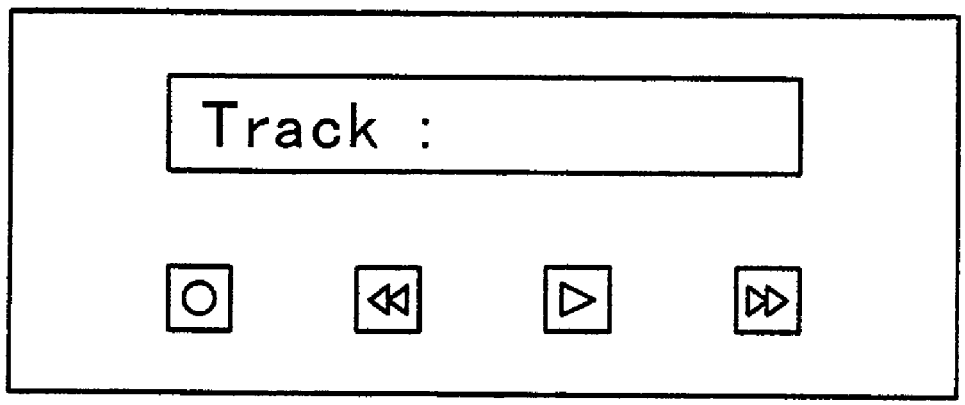
FIG. 28 is a schematic diagram showing a display example of a message screen.

Next, with reference to a flow chart shown in FIG. 27, a device control process will be described. When the user operates the touch panel 18 of the first receiving device 3, the device control application gets starts and executes the device control process.

At step S51, the CPU 10 executes the above-described user login process (see FIG. 8). Thereafter, the flow advances to step S52. At step S52, the CPU 10 causes the above-described device selection GUI screen (see FIG. 9) of the user interfaces of the application 41 to be displayed as a window on the LCD 17.

At step S53, when the user designates a controlled device (the CD player 4 and the digital VCR 6 to the digital TV receiver 9) on the device selection GUI screen (the device selection buttons 52 to 56) and presses the device controller button 64 at the lower right position of the screen, the CPU 10 obtains access right information of the designated controlled device (one of the CD player 4 and the second receiving device 5 to the digital TV receiver 9) from the device access table (see FIG. 6) through the device access manager 43 of the HAVi software module 40. At that point, the designated controlled device (one of the CD player 4 and the digital VCR 6 to the digital TV receiver 9) sends the current user name to the CPU 10. The current user name is displayed on the current user name 50 of the device selection GUI screen (see FIG. 9).

At step S54, the CPU 10 determines whether or not an owner has been registered for the designated controlled device (one of the CD player 4 and the digital VCR 6 to the digital TV receiver 9). In reality, the CPU 10 determines whether or not the device access manager 43 of the HAVi software module 40 can read the owner name as the user attribute registered to the device control module corresponding to the designated controlled device (one of the CD player 4 and the digital VCR 6 to the digital TV receiver 9) from the device access table.

When the determined result at step S54 is Yes (namely, an owner has been registered for the designated controlled device), the flow advances to step S55. At step S55, the CPU 10 obtains access right information of various types of control contents (record, reproduction, rewind, and so forth) of the current user for the designated controlled device (one of the CD player 4 and the digital VCR 6 to the digital TV receiver 9).

In reality, when the owner of the device has registered the device access right for the current user (namely, the owner has assigned a particular access right to the current user), the CPU 10 obtains the access right information assigned by the owner from the device access table.

On the other hand, when the determined result at step S54 is No (namely, the owner of the device has not registered a device access right for the current user), the CPU 10 references the device access table and determines whether or not the owner has registered a particular access right for an anonymous user. When an access right has been assigned to an anonymous user, the CPU 10 obtains access right information assigned for an anonymous user from the device access table.

At step S56, the CPU 10 performs an assignment process for displaying a control content of the access right for the designated controlled device (one of the CD player 4 and the digital VCR 6 to the digital TV receiver 9) as a user interface. At that point, the device access manager 43 successively reads data that represents various control contents (reproduction function control, record function control, or power on/off) corresponding to the designated controlled device from the device control module and designates user interface representation information (DDI: Data Driven Interaction) corresponding to the control contents.

At step S57, the CPU 10 determines whether or not the user interface representation information (DDI) has been assigned for all the control contents of the designated controlled device (one of the CD player 4 and the digital VCR 6 to the digital TV receiver 9). When the determined result at step S57 is No (namely, the user interface representation information (DDI) has not been assigned), the flow returns to step S55. At step S55, the CPU 10 repeats the process.

When the determined result at step S57 is Yes (namely, the user interface representation information has been assigned for all control contents of the designated controlled device (one of the CD player 4 and the digital VCR 6 to the digital TV receiver 9)), the flow advances to step S59. At step S59, the CPU 10 causes a user interface of the application 41 corresponding to all the assigned user interface representation information to be displayed as a window on the LCD 17 (this interface is referred to as device operation GUI screen (not shown)). Thereafter, the flow advances to step S60.

When the owner of the device has not registered a device access right for the current user (or an anonymous user), the flow advances to step S59. At step S59, the CPU 10 causes a message screen "ACCESS RIGHT HAS NOT BEEN ASSIGNED." (not shown) to be displayed as a window on the LCD 17. At that point, the flow returns to step S52. The CPU 10 repeats the process from step S52.

At step S59, the CPU 10 causes icons of function buttons corresponding to access assigned functions of the designated controlled device (one of the CD player 4 and the digital VCR 6 to the digital TV receiver 9) to be displayed on the LCD 17 so that the designated controlled device is accessed with the icons of the function buttons.

Figure 29:
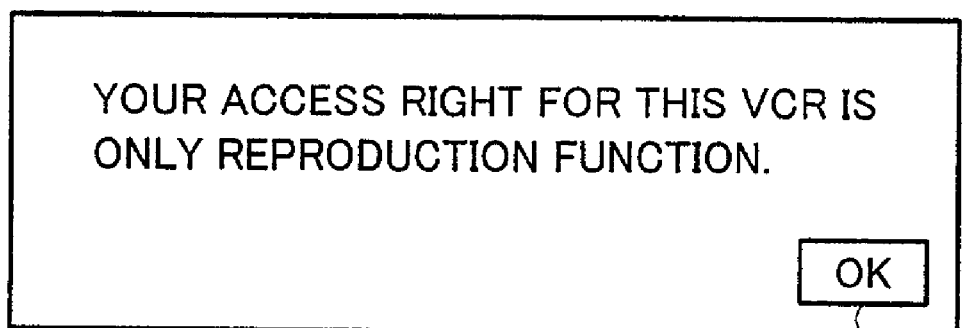
FIG. 29 is a schematic diagram showing a display example of a message screen.

Alternatively, control buttons corresponding to access prohibited functions may be displayed in such a manner that they cannot be operated. In such a case, when the user presses such a control button, a message screen "YOUR ACCESS RIGHT FOR THIS VCR IS ONLY REPRODUCTION FUNCTION." may be displayed as a window as shown in FIG. 29. When the user presses an OK button 211, the CPU 10 exits from the message screen (see FIG. 29).

When the determined result at step S54 is No (namely, an owner of the designated controlled device has not been registered), since the owner of the designated controlled device (one of the CD player 4 and the digital VCR 6 to the digital TV receiver 9) has not been registered, the flow advances to step S58. At step S58, the CPU 10 causes all function buttons of the controlled device to be displayed as icons on the device operation screen (not shown) and all the control contents of the controlled device to be enabled. Thereafter, the flow advances to step S59. At step S59, the CPU 10 performs the above-described process.

At step S60, when the user designates a desired control content (reproduction function control, record function control, or power on/off) on the device operation GUI screen of the LCD 17, the CPU 10 controls the designated controlled device (one of the CD player 4 and the digital VCR 6 to the digital TV receiver 9) corresponding to the control program of the FCM of the controlling device and completes the process.

Thus, in the above-described AV system 1, when the user designates a desired controlled device as a control object in the number of controlled devices that are the CD player 4 and the digital VCR 6 to the digital TV receiver 9 connected to the IEEE 1394 bus 2 on the device selection GUI screen (see FIG. 9) displayed on the LCD 17 of the first receiving device 3, even if the designated controlled device is a control object of the second receiving device 5, the user can freely control the assigned control range of the designated controlled device.

In other words, the user registers as a user attribute particular user (owner or guest) or an anonymous user who has an access right for each of the number of controlled devices that are the CD player 4 and the digital VCR 6 to the digital TV receiver 9 mutually connected through the IEEE 1394 bus 2 using the first receiving device 3 as a controlling device to the device access table (see FIG. 6). As a result, when a particular controlled device (one of the CD player 4 and the digital VCR 6 to the digital TV receiver 9) is designated, the first receiving device 3 can obtain the user attribute registered for the designated controlled device from the device access table.

When the current user has been registered as an owner of a designated controlled device (the CD player 4 or the digital VCR 6 to the digital TV receiver 9), the user can freely control the control content of the designated controlled device through the first receiving device 3. In addition, the current user can register a new user who has an access right for the designated controlled device.

On the other hand, when the current user of a designated controlled device has been registered as a guest thereof and has been assigned a particular control range thereof, the current user can control the designated controlled device in the assigned control range through the first receiving device 3.

When an owner has not been registered to a designated controlled device (one of the CD player 4 and the digital VCR 6 to the digital TV receiver 9), an anonymous user can freely control the designated controlled device in an access range assigned thereto.

Thus, the controlling device (the first receiving device 3) allows only a user having a management right corresponding to a designated attribute of a designated controlled device (namely, an owner) to assign a designated control content to another user who uses the designated controlled device. Thus, the owner can designate the control content of each user for each controlled device.

The CD player 4 and the digital TV receiver 9 as control objects of the second receiving device 5 rather than the first receiving device 3 can be controlled in the control ranges corresponding to user attributes registered to thereto using the first receiving device 3. In other words, the AV system 1 that allows a number of controlled devices (the CD player 4 and the digital VCR 6 to the digital TV receiver 9) connected on the home network to be controlled corresponding to operation ranges of users through the first receiving device 3 or the second receiving device 5 as a controlling device can be accomplished.

In the above embodiment, the present invention is applied to the first receiving device 3 and the second receiving device 5 of the AV system 1. However, the present invention is not limited to such an example. Instead, the present invention can be applied to various types of controlling devices that control a number of controlled devices connected on the network.

As an example of the network system, the IEEE 1394 bus 2 was described. However, the present invention can be applied to various network systems of which a controlling device can control controlled devices through a network (an example of such a network system is USB (Universal Serial Bus)).

As an example of middleware for integrally managing and controlling a number of electronic devices (the first receiving device 3 to the digital TV receiver 9) connected on the network, the HAVi software module 40 was described. However, the present invention is not limited to such an example. Instead, as long as each electronic device can be integrally managed and controlled, various types of software modules can be used.

In the above embodiment, the first receiving device 3 as a structural member of the AV system 1 was used as a controlling device. However, the present invention is not limited to such an example. Instead, the second receiving device 5 can be used for a controlling device. Moreover, besides a receiving device (IRD), various types of devices that can execute the HAVi software can be used. For example, a digital television receiver, an AV selector, and a personal computer can be used (for example, an FAV and an IAV). Besides the digital VCR 6 as a BAV (Base AV Device) or an LAV (Legacy AV Device) class designated by the designer, various types of digital AV devices such as the CD player 4, the MD deck 7, the DVD player 8, and the digital TV receiver 9 can be used for control objects.

In the above embodiment, a user name having a control right in an assigned control range for each controlled device is registered corresponding to a user attribute (owner, guest, or anonymous user). However, the present invention is not limited to such an example. In other words, as long as a user who can use a controlled device in all the operation range is registered as an owner and the user can assigns an operation range to another user for the controlled device, various types of attributes can be registered.

When a user accesses a controlled device (one of the CD player 4 and the digital VCR 6 to the digital TV receiver 9)

to which an owner has not registered a guest, the user name is registered as an owner who can use all the operation range of the controlled device. However, when the user name has not been registered to the controlled device, assuming that an anonymous user has been registered for the controlled device, regardless of the user name, the controlled device can be controlled in the control range assigned for the anonymous user.

In the above embodiment, a controlling device restricts the control range of a controlled device corresponding to a device access table (see FIG. 6) through a network. However, the present invention is not limited to such an example. Instead, when the user designates a desired controlled device using a controlling device, the controlling device can transfer the device access table (see FIG. 6) to the controlled device (in other words, the controlling device transmits data that represents the relation of guests and access rights of control contents to the controlled device). As a result, the controlled device can restrict itself.

In more reality, when a user designates a desired device displayed on the device selection GUI screen on the LCD 17 of the first receiving device 3 using a relevant button of device selection buttons 51 to 57 and presses a device control button 54, the CPU 10 reads a device access table (see FIG. 6) corresponding to the designated device and an access right table (see FIG. 7) and transfers these tables to the designated controlled device through the IEEE 1394 bus 2. The controlled device stores the transferred tables to its memory (not shown). As a result, the controlled device can control itself.

When the user presses a transfer button 221 on a guest management GUI screen shown in FIG. 30, the controlling device may transfer the device access table (see FIG. 6) and the access right table (see FIG. 7) to the controlled device.

In addition, after the controlled device has stored the device access table and the access right table received from the controlling device to the memory, the controlled device can be disconnected from the network. In this case, the controlled device disconnected from the network can be used in the limited operation range for each user or along with another digital AV device.

In the above embodiment, the first receiving device 3 as an FAV or an IAV uses an access right for controlled devices. However, the present invention is not limited to such an example. Instead, the first receiving device 3 as a controlling device can control itself corresponding to a designated device access table stored therein.

In other words, in reality, the first receiving device 3 registers user attributes representing operation ranges of individual users (the user attributes are assigned by the owner) to the device access table (see FIG. 6). When a user logs in the first receiving device 3, the CPU 10 references the device access table, obtains the user attribute corresponding to the user name from the device access table, and causes the first receiving device 3 to control itself in the control range assigned to the user.

The above-described processes can be executed by software. The software may be executed by a computer whose hardware stores it. Alternatively, the software many be installed from a record medium to a general purpose personal computer or the like that installs various types of programs and executes various types of functions.

As shown in FIG. 2, the record medium is supplied separately from the computer to the user. The record medium may be a magnetic disc 21 (including a floppy disk), an optical disc 22 (including an CD-ROM (Compact Disc—Read Only Memory) and a DVD (Digital Versatile Disc), a magneto-optical disc 23 (including an MD (Mini Disc)), or a package medium such as a semiconductor memory 24.

The present invention contemplates that the steps of a program recorded on a record medium may be executed in sequence, in parallel, or discretely. In addition, the system of the present invention represents the entire apparatus composed of a number of devices.

According to a first information processing apparatus, and a first information processing method of the present invention, device attribute information is obtained from an electronic device through a network. An operation range of each user for the electronic device is assigned corresponding to the obtained device attribute information. The electronic device is controlled in the assigned operation range through the network. Thus, the information processing apparatus can assign the operation range of each user. In addition, the information processing apparatus can control the electronic device connected through the network in the assigned operation range.

According to a second information processing apparatus, a second information processing method, and a second information processing program of the present invention, device attribute information is obtained from an electronic device through a network. An operation range of each user for the electronic device is assigned corresponding to the obtained device attribute information. The operation range of each user is transferred to the electronic device through the network. Thus, the operation range of each user can be assigned for the electronic device connected through the network.

According to a third information processing apparatus, a third information processing method, and a third information processing program of the present invention, an operation range of each user is obtained from another information processing apparatus through a network. The obtained operation range is stored. Thus, even if the local information processing apparatus is disconnected from the network, the information processing apparatus can control itself in the stored operation range.

According to a fourth information processing apparatus, a fourth information processing method, and a fourth information processing program of the present invention, an operation range of each unit is assigned. The information processing apparatus is controlled in the assigned operation range. Thus, the information processing apparatus can assign an operation range to each user. In addition, the information processing apparatus can control itself in the assigned operation range.

According to a first network system of the present invention, a first electronic device obtains device attribute information from a second electronic device through a network. The first electronic device assigns an operation range of each user for the second electronic device corresponding to the obtained device attribute information. The first electronic device controls the second electronic device in the assigned operation range through the network. The second electronic device stores device attribute information thereof. The second electronic device sends the stored device attribute information to the first electronic device through the network corresponding to a request therefrom. Thus, the first electronic device can assign an operation range thereof for each user. In addition, the first electronic device can control the second electronic device in the assigned operation range.

According to a second network system of the present invention, a first electronic device obtains device attribute information from a second electronic device through a network. The first electronic device assigns an operation range of each user for the second electronic device corresponding to the obtained device attribute information. The first electronic device transfers the assigned operation range to the second electronic device through the network. The second electronic device obtains the operation range of each user transferred from the first electronic device through the network and stores the operation range. Thus, even if the second electronic device is disconnected from the network, the second electronic device can control itself in the stored operation range.

Although the present invention has been shown and described with respect to a best mode embodiment, it should be understood by those skilled in the art that the foregoing and various other changes, omissions, and additions in the form and detail thereof may be made without departing from the spirit and scope of the present invention.

I claim as my invention:

1. A network system for mutually connecting a first electronic device and a second electronic device through a network,
   wherein the first electronic device comprises:
   a device attribute information obtaining part for obtaining device attribute information about the second electronic device therefrom through the network;
   an operation range assigning part for assigning an operation range of each user of the second electronic device corresponding to the device attribute information obtained by the device attribute information obtaining part and storing the assigned operation range; and
   a controlling part for controlling the second electronic device through the network in the operation range assigned by the operation range assigning part, and
   wherein the second electronic device comprises:
   a device attribute information storing part for storing device attribute 10 information about the second electronic device; and
   a device attribute information transmitting part for transmitting the device attribute information stored in the device attribute information storing part to the first electronic device through the network corresponding to a request of the first electronic device.

2. A network system for mutually connecting a first electronic device and a second electronic device through a network, wherein the first electronic device comprises:
   a device attribute information obtaining part for obtaining device attribute information about the second electronic device therefrom through the network;
   an operation range assigning part for assigning an operation range of each user of the second electronic device corresponding to the device attribute information obtained by the device attribute information obtaining part and storing the assigned operation range; and
   a transferring part for transferring the operation range of each user stored by the operation range assigning part to the second electronic device through the network, and
   wherein the second electronic device comprises:
   a device attribute information storing part for storing device attribute information about the second electronic device;
   a device attribute information transmitting part for transmitting the device attribute information stored in the device attribute information storing part to the first electronic device through the network corresponding to a request of the first electronic device; and
   an operation range obtaining part for obtaining the operation range of each user from the first electronic device through the network.

3. An information processing apparatus for controlling an electronic device connected on a network, comprising:
   a device attribute information obtaining part for obtaining device attribute information about the electronic device from the electronic device through the network;
   an operation range assigning part for assigning an operation range of each user for the electronic device corresponding to the device attribute information obtained by the device attribute information obtaining part and storing the assigned operation range;
   a controlling part for controlling the electronic device through the network in the operation range that has been assigned by the operation range assigning part;
   a user name inputting part for inputting a user name of a user who uses the electronic device;
   an authenticating part for authenticating the user name that has been input by the user name inputting part; and
   an owner determining part for determining whether or not the user name authenticated by the authenticating part is an owner registered by an owner registering part;
   wherein, when the determined result of the owner determining part represents that the user name is not the owner registered by the owner registering part, the operation range assigning part does not permit the user to assign the operation range of each user.

4. An information processing apparatus as claimed in claim 3, further comprising:
   a control information obtaining part for obtaining control information for controlling the electronic device from the electronic device through the network;
   wherein the controlling part controls the electronic device corresponding to the control information obtained by the control information obtaining part.

5. An information processing apparatus as claimed in claim 3, further comprising:
   a control information storing part for prestoring control information for controlling the electronic device;
   wherein the controlling part controls the electronic device corresponding to the control information pre-stored in the control information storing part.

6. An information processing apparatus as claimed in claim 3, wherein
   the owner registering part is operable to register the user as the owner who is capable of using the entire operation range of the electronic device, and
   wherein the operation range assigning part assigns the operation range of each user for the electronic device corresponding to a command issued by the owner registered by the owner registering part.

7. An information processing apparatus as claimed in claim 3, further comprising:
   a guest registering part for permitting a particular user as a guest to use at least part of the operation range of the electronic device; and
   an anonymous registering part for permitting an anonymous user to use at least part of the operation range of the electronic device.

8. An information processing apparatus as claimed in claim 7, further comprising:
   a guest determining part for determining whether the user name authenticated by the authenticating part is the guest registered by the guest registering part; and
   wherein, when the determined result of the guest determining part represents that the user name is the guest registered by the guest registering part, the operation range assigning part assigns at least part of the operation range to the guest.

9. An information processing apparatus as claimed in claim 8, further comprising:
an anonymous determining part for determining whether the anonymous user has been registered by the anonymous registering part when the determined result of the guest determining part represents that the user name is not the guest registered by the guest registering part;
wherein, when the determined result of the anonymous determining part represents that the anonymous user has been registered by the anonymous registering part, the operation range assigning part assigns at least part of the operation range to the anonymous user.

10. An information processing apparatus as claimed in claim 9,
wherein, when the determined result of the anonymous determining part represents that the anonymous user has not been registered by the anonymous registering part, the controlling part does not control the electronic device.

11. An information processing apparatus as claimed in claim 3, further comprising:
a user registering part for registering user information about the user who uses the electronic device;
a user information inputting part for inputting the user information about the user who uses the electronic device; and
an authenticating part for authenticating whether the user information that has been input by the user information inputting part has been registered by the user registering part;
wherein, when the user information has been authenticated by the authenticating part, the controlling part reads the operation range corresponding to the user information from the operation range assigning part and controls the electronic device in the operation range.

12. An information processing apparatus as claimed in claim 11, wherein, when the user information has not been authenticated by the authenticating part, the controlling part does not control the electronic device.

13. An information processing apparatus as claimed in claim 3, further comprising:
a display controlling part for controlling a display of the operation range of each user stored by the operation range assigning part.

14. An information processing apparatus as claimed in claim 3,
wherein the device attribute information includes one of a device ID of the electronic device, a type of the electronic device, and information about a function of the electronic device.

15. An information processing apparatus as claimed in claim 3,
wherein the network includes an IEEE 1394 serial bus.

16. An information processing apparatus for controlling an electronic device connected on a network, comprising:
a device attribute information obtaining part for obtaining device attribute information about the electronic device from the electronic device through the network;
an operation range assigning part for assigning an operation range of each user for the electronic device corresponding to the device attribute information obtained by the device attribute information obtaining part and storing the assigned operation range;
a transferring part for transferring the operation range of each user stored by the operation range assigning part to the electronic device through the network;
a guest registering part for permitting a particular user as a guest to use at least part of the operation range of the electronic device;
an anonymous registering part for permitting an anonymous user to use at least part of the operation range of the electronic device;
a user name inputting part for inputting a user name of each user who uses the electronic device;
an authenticating part for authenticating the user name that has been input by the user name inputting part;
a guest determining part for determining whether the user name authenticated by the authenticating part is the guest registered by the guest registering part, wherein, when the determined result of the guest determining part represents that the user name is the guest registered by the guest registering part, the operation range assigning part assigns at least part of the operation range to the guest; and
an anonymous determining part for determining whether the anonymous user has been registered by the anonymous registering part when the determined result of the guest determining part represents that the user name is not the guest registered by the guest registering part wherein, when the determined result of the anonymous determining part represents that the anonymous user has been registered by the anonymous registering part, the operation range assigning part assigns at least part of the operation range to the anonymous user,
and wherein, when the determined result of the anonymous determining part represents that the anonymous user has not been registered by the anonymous registering part, the information processing apparatus does not control the electronic device.

17. An information processing apparatus as claimed in 16, further comprising:
a control information obtaining part for obtaining control information for controlling the electronic device from the electronic device through the network;
wherein the information processing apparatus controls the electronic device corresponding to the control information obtained by the control information obtaining part.

18. An information processing apparatus as claimed in claim 16, further comprising:
a control information storing part for prestoring control information for controlling the electronic device;
wherein the information processing apparatus controls the electronic device corresponding to the control information pre-stored in the control information storing part.

19. An information processing apparatus as claimed in claim 16, further comprising:
an owner registering part for registering the user as the owner who is capable of using all of the operation range of the electronic device;
wherein the operation range assigning part assigns the operation range of each user for the electronic device corresponding to a command issued by the owner registered by the owner registering part.

20. An information processing apparatus as claimed in claim 19, further comprising:
an owner determining part for determining whether the user name authenticated by the authenticating part is the owner registered by the owner registering part.

21. An information processing apparatus as claimed in claim 20,
wherein, when the determined result of the owner determining part represents that the user name is not the owner registered by the owner registering part, the operation range assigning part does not permit the user to assign the operation range of each user.

22. An information processing apparatus as claimed in claim 16, further comprising:
a user registering part for registering user information about the user who uses the electronic device;
a user information inputting part for inputting the user information about the user who uses the electronic device; and
an authenticating part for authenticating whether the user information that has been input by the user information inputting part has been registered by the user registering part;
wherein, when the user information has been authenticated by the authenticating part, the information processing apparatus reads the operation range corresponding to the user information from the operation range assigning part and controls the electronic device in the operation range.

23. The information processing apparatus as claimed in claim 22,
wherein, when the user information has not been authenticated by the authenticating part, the information processing apparatus does not control the electronic device.

24. An information processing apparatus as claimed in claim 16, further comprising:
a display controlling part for controlling a display of the operation range of each user stored by the operation range assigning part.

25. An information processing apparatus as claimed in claim 16,
wherein the device attribute information includes one of a device ID of the electronic device, a type of the electronic device, and information about a function of the electronic device.

26. An information processing apparatus as claimed in claim 16,
wherein the network includes an IEEE 1394 serial bus.

27. An information processing apparatus, comprising:
an operation range assigning part for assigning an operation range of each user;
a controlling part for controlling the information processing apparatus in the operation range assigned by the operation range assigning part;
a guest registering part for permitting a particular user as a guest to use all or part of the operation range of the information processing apparatus;
an anonymous registering part for permitting an anonymous user to use all or part of the operation range of the information processing apparatus;
a user name inputting part for inputting a user name of the user who uses the information processing apparatus;
an authenticating part for authenticating the user name that has been input by the user name inputting part;
a guest determining part for determining whether the user name authenticated by the authenticating part is the guest registered by the guest registering part, wherein when the determined result of the guest determining part represents that the user name is the guest registered by the guest registering part, the operation range assigning part assigns at least part of the operation range to the guest; and
an anonymous determining part for determining whether the anonymous user has been registered by the anonymous registering part when the determined result of the guest determining part represents that the user name is not the guest registered by the guest registering part, wherein when the determined result of the anonymous determining part represents that the anonymous user has been registered by the anonymous registering part, the operation range assigning part assigns at least part of the operation range to the anonymous user;
wherein, when the determined result of the anonymous determining part represents that the anonymous user has not been registered by the anonymous registering part, the controlling part does not control the information processing apparatus.

28. An information processing apparatus as claimed in claim 27, further comprising:
an owner registering part for registering the user as an owner who is capable of using all of the operation range of the information processing apparatus;
wherein the operation range assigning part assigns the operation range of each user for the information processing apparatus corresponding to a command issued by the owner registered by the owner registering part.

29. An information processing apparatus as claimed in claim 28 further comprising:
a user name inputting part for inputting a user name of a particular user who uses the information processing apparatus;
an authenticating part for authenticating the user name that has been input by the user name inputting part;
an owner determining part for determining whether the user name authenticated by the authenticating part is the owner registered by the owner registering part.

30. An information processing apparatus as claimed in claim 29,
wherein, when the determined result of the owner determining part represents that the user name is not the owner registered by the owner registering part, the operation range assigning part does not permit the user to assign the operation range of each user.

31. An information processing apparatus as claimed in claim 27, further comprising:
a user registering part for registering user information about the user who uses the information processing apparatus;
a user information inputting part for inputting the user information about the user who uses the information processing apparatus; and
an authenticating part for authenticating whether the user information that has been input by the user information inputting part has been registered by the user registering part;
wherein, when the user information has been authenticated by the authenticating part, the controlling part reads the operation range corresponding to the user information from the operation range assigning part and controls the information processing apparatus in the operation range.

32. An information processing apparatus as claimed in claim 31,
wherein, when the user information has not been authenticated by the authenticating part, the controlling part does not control the information processing apparatus.

33. An information processing apparatus as claimed in claim 27, further comprising:
  a display controlling part for controlling a display of the operation range of each user stored by the operation range assigning part.

34. An information processing apparatus as claimed in claim 27,
  an operation range assigning part for assigning an operation range of each user;
  a controlling part for controlling the information processing apparatus in the operation range assigned by the operation range assigning part;
  a user registering part for registering user information about a user who uses the information processing apparatus;
  a user information inputting part for inputting the user information about the user who uses the information processing apparatus; and
  an authenticating part for authenticating whether the user information that has been input by the user information inputting part has been registered by the user registering part;
  wherein, when the user information has been authenticated by the authenticating part, the controlling part reads the operation range corresponding to the user information from the operation range assigning part and controls the information processing apparatus in the operation range;
  wherein, when the user information has not been authenticated by the authenticating part, the controlling part does not control the information processing apparatus.

35. An information processing apparatus as claimed in claim 34, further comprising:
  an owner registering part for registering the user as an owner who is capable of using all of the operation range of the information processing apparatus;
  wherein the operation range assigning part assigns the operation range of each user for the information processing apparatus corresponding to a command issued by the owner registered by the owner registering part.

36. An information processing apparatus as claimed in claim 35 further comprising:
  a user name inputting part for inputting a user name of a user who uses the information processing apparatus;
  an authenticating part for authenticating the user name that has been input by the user name inputting part; and
  an owner determining part for determining whether the user name authenticated by the authenticating part is the owner registered by the owner registering part.

37. An information processing apparatus as claimed in claim 36,
  wherein, when the determined result of the owner determining part represents that the user name is not the owner registered by the owner registering part, the operation range assigning part does not permit the user to assign the operation range of each user.

38. An information processing apparatus as claimed in claim 34, further comprising:
  a guest registering part for permitting a particular user as a guest to use all or part of the operation range of the information processing apparatus; and
  an anonymous registering part for permitting an anonymous user to use all or part of the operation range of the information processing apparatus.

39. An information processing apparatus as claimed in claim 38, further comprising:
  a user name inputting part for inputting a user name of the user who uses information processing apparatus;
  an user name authenticating part for authenticating the user name that has been input by the user name inputting part; and
  a guest determining part for determining whether the user name authenticated by the authenticating part is the guest registered by the guest registering part;
  wherein, when the determined result of the guest determining part represents that the user name is the guest registered by the guest registering part, the operation range assigning part assigns at least part of the operation range to the guest.

40. An information processing apparatus as claimed in claim 39, further comprising:
  an anonymous determining part for determining whether the anonymous user has been registered by the anonymous registering part when the determined result of the guest determining part represents that the user name is not the guest registered by the guest registering part;
  wherein, when the determined result of the anonymous determining part represents that the anonymous user has been registered by the anonymous registering part, the operation range assigning part assigns at least part of the operation range to the anonymous user.

41. An information processing apparatus as claimed in claim 40,
  wherein, when the determined result of the anonymous determining part represents that the anonymous user has not been registered by the anonymous registering part, the controlling part does not control the information processing apparatus.

42. An information processing apparatus as claimed in claim 34, further comprising:
  a display controlling part for controlling a display of the operation range of each user stored by the operation range assigning part.

* * * * *